United States Patent
Kato

(10) Patent No.: US 6,339,971 B1
(45) Date of Patent: *Jan. 22, 2002

(54) PEDAL SUPPORTING STRUCTURE OF A VEHICLE

(75) Inventor: Yoshihisa Kato, Nishikamo-Gun (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/818,452

(22) Filed: Mar. 17, 1997

(30) Foreign Application Priority Data

Mar. 25, 1996 (JP) .............................. 8-068515

(51) Int. Cl.⁷ .......................... G05G 1/14; B60K 28/14

(52) U.S. Cl. .......................... 74/512; 74/560; 180/274; 180/275

(58) Field of Search .................... 74/512, 513, 575, 74/560, 514, 531; 192/111 A, 33 S; 188/136 BA

(56) References Cited

U.S. PATENT DOCUMENTS

| | | | |
|---|---|---|---|
| 3,025,713 A | 3/1962 | Koshaba et al. | 74/478 |
| 3,911,760 A | 10/1975 | Elbers et al. | 74/512 |
| 4,426,890 A * | 1/1984 | Hansen | 74/478 |
| 5,078,024 A | 1/1992 | Cicotte et al. | 74/512 |
| 5,086,663 A | 2/1992 | Asano et al. | 74/512 |
| 5,120,106 A * | 6/1992 | Sakurai et al. | 296/194 |
| 5,165,299 A * | 11/1992 | Mizuma et al. | 74/560 X |
| 5,181,435 A * | 1/1993 | Khalifa et al. | 74/492 |
| 5,327,797 A * | 7/1994 | Seifrit | 74/512 |
| 5,385,068 A * | 1/1995 | White et al. | 74/512 |
| 5,460,061 A * | 10/1995 | Redding et al. | 74/512 |
| 5,555,774 A * | 9/1996 | Lauring et al. | 74/512 |
| 5,615,749 A * | 4/1997 | Kato | 180/274 |
| 6,006,626 A * | 12/1999 | Notake et al. | 74/512 |
| 6,041,674 A * | 3/2000 | Kato | 74/512 |
| 6,070,488 A * | 6/2000 | Yabusaki et al. | 74/512 |

FOREIGN PATENT DOCUMENTS

| | | | |
|---|---|---|---|
| DE | 2841988 | 4/1980 | |
| DE | 2923027 | * 2/1985 | 74/512 |
| DE | 3904616 A1 | 8/1989 | |
| DE | A 3904616 | 8/1989 | |
| DE | 43 35 511 A1 | 5/1994 | |
| EP | 56-263973 | * 12/1981 | 180/274 |
| EP | 56-263973 | * 12/1991 | 180/274 |
| FR | 1181194 | * 6/1959 | 74/512 |
| GB | 2031814 A | 4/1980 | 74/512 |
| GB | 2316467 A | * 2/1998 | 74/512 |
| JP | 56-146675 | 4/1980 | |
| JP | 56-163973 | * 12/1981 | 180/274 |
| JP | 58-47923 | * 3/1983 | 74/512 |
| JP | U 1-73464 | 5/1989 | |
| JP | 56-163973 | * 12/1991 | 180/274 |
| JP | 6-211115 | 8/1994 | |
| JP | 10-512518 | 12/1998 | |

* cited by examiner

*Primary Examiner*—Vinh T. Luong
(74) *Attorney, Agent, or Firm*—Oliff & Berridge, PLC

(57) ABSTRACT

A pedal supporting structure in which a pedal is prevented from being moved in a direction toward a passenger compartment if a deformation occurs in a dash panel in the direction toward the passenger compartment. A pedal bracket pivotally supports a lever portion of the pedal. A connection mechanism disengageably engages a portion of the pedal bracket to a body member located near the pedal bracket. A guiding mechanism guides movement of the pedal bracket so that the movement of the pedal bracket causes movement of the pedal relative to the body member in a rear-to-front direction of the vehicle.

19 Claims, 17 Drawing Sheets

PEDAL SUPPORTING STRUCTURE OF A VEHICLE

BACKGROUND OF THE INVENTION

1. Field of the Invention

The present invention relates to a pedal supporting structure of a vehicle and, more particularly, to a pedal supporting structure for supporting a pedal provided in a foot space associated with a driver's seat.

2. Description of the Related Art

When a large deceleration is generated in a vehicle, a large inertial force is exerted on the driver of that vehicle in a frontward direction of the vehicle. If the driver moves in the forward direction of the vehicle due to the inertial force, the driver's knee may hit a steering column support construction or structure supporting a steering column which supports a steering wheel.

Japanese Laid-Open Utility Model Application No. 1-73464 discloses a knee protector which reduces a shock applied to the driver. The knee protector is provided under the steering column so that a bracket, which mounts the steering column to the vehicle body, is covered by the knee protector. In such a construction, the driver's knee does not directly hit the bracket of the steering column. Thus, the shock applied to the driver's knee can be reduced.

If a large force (energy) is applied to the front side of the vehicle, a large deceleration is generated in the vehicle and additionally, a deformation toward the passenger compartment of the vehicle may occur of a dash panel which isolates the passenger compartment from the engine compartment. If the dash panel deforms toward the passenger compartment, the foot space associated with the driver's seat is reduced. This increases a possibility of the driver's knee colliding with the bracket of the steering column. Accordingly, in order to prevent or reduce a shock applied to the driver when a large force is exerted on the front side of the vehicle, it is preferred that a large space is maintained even when a deformation occurs in the dash panel.

In the foot space associated with the driver's seat, pedals such as a brake pedal are provided. If the pedals can be moved toward the dash panel when the above-mentioned deformation occurs in the dash panel, a large space can be maintained in the driver's seat. That is, if a supporting construction of the pedals has such a function, the possibility of the driver's knee colliding with the bracket of the steering column is reduced.

SUMMARY OF THE INVENTION

It is a general object of the present invention to provide an improved and useful pedal supporting structure or structure in which the above-mentioned problems are eliminated.

A more specific object of the present invention is to provide a pedal supporting structure or construction in which a pedal is prevented from being moved in a direction toward a passenger compartment if a deformation occurs in a dash panel in the direction toward the passenger compartment.

In order to achieve the above-mentioned objects, there is provided according to the present invention a pedal supporting structure or construction of a vehicle, including:

a pedal including a lever portion extending from the pedal;

a pedal bracket pivotally supporting the lever portion of the pedal;

a body member of the vehicle located adjacent the pedal bracket;

a connection mechanism disengageably engaging a portion of the pedal bracket to the body member; and a guiding mechanism for guiding a movement of the pedal bracket so that the movement of the pedal bracket causes a movement of the pedal relative to the body member in a rear-to-front direction of the vehicle.

According to the above-mentioned invention, the pedal bracket, which is located in a foot space associated with a driver's seat, is engaged to the body member. Thus, the pedal bracket provides sufficient rigidity with respect to the depression force exerted on the pedal. If the pedal bracket is moved, for example, due to a front end crash of the vehicle, the pedal bracket is disengaged from the body member and moves in the front-to-rear direction of the vehicle. The movement of the pedal bracket is guided by the guiding mechanism so that the pedal is moved relative to the body member in a rear-to-front direction of the vehicle while the pedal bracket is moved in the front-to-rear direction. Thus, a large space is preserved in a foot space associated with the driver's seat or position even when the pedal bracket is rapidly moved in the front-to-rear direction of the vehicle due to a front end crash.

In the pedal supporting structure according to the present invention, the pedal bracket may be disengaged from the body member when the pedal bracket is moved in a predetermined direction, the predetermined direction being substantially the same as a direction of the movement of the pedal bracket being guided by the guiding mechanism.

According to the invention, the pedal bracket is guided by the guiding mechanism from the moment of disengagement. Thus, the movement of the pedal bracket is effectively converted into the rear-to-front movement of the pedal.

Additionally, the pedal bracket may be disengaged from the body member when the pedal bracket is moved in a predetermined direction, the predetermined direction being substantially the same as a direction of a force transmitted to the pedal bracket when a substantial force is exerted on a front end of the vehicle in a front-to-rear direction of the vehicle.

According to this invention, since the direction of disengagement of the pedal bracket is the same as the direction of the force exerted on the pedal bracket, the pedal bracket is surely or positively disengaged from the body member when the pedal is moved by the force.

In one embodiment of the present invention, the guiding mechanism includes:

a vehicle body side slide member fixed to the body member, the vehicle body side slide member having a surface slanted by a slanting angle with respect to a front-to-rear direction of the vehicle so that a rear end of the slanted surface is lower than a front end of the slanted surface; and a bracket side slide portion formed on an upper side of the pedal bracket, the bracket side slide portion contacting the slanted surface.

According to this embodiment, the upper side of the pedal bracket is moved downwardly while the pedal bracket is moved in the front-to-rear direction. This movement of the pedal bracket causes the pedal to be moved in the rear-to-front direction.

Additionally, the slanting angle may be increased from the front end toward the rear end of the slanted surface. In such a construction, a smooth sliding movement of the pedal bracket is provided in the initial stage. A ratio of the downward movement to the rearward movement of the pedal bracket is increased as the movement of the pedal bracket progresses.

The slanting surface may be a curved surface.

Additionally, the pedal bracket may comprise a rounded smooth surface connected to a rear end of the bracket side slide portion, the rounded smooth surface moving ahead of the bracket side slide portion when the pedal bracket moves in the front-to rear direction of the vehicle.

Further, the pedal bracket may comprise a flexible portion connected to a rear end of the bracket side slide portion, the flexible portion moving ahead of the bracket side slide portion when the pedal bracket moves in the front-to-rear direction of the vehicle so that the flexible portion is deformed when the flexible portion is pressed against the slanted surface.

In another embodiment according to the present invention, the guiding mechanism includes:

a bracket side slide portion formed on an upper side of the pedal bracket, the bracket side slide portion having a slanted surface which is slanted by a slanted angle with respect to a front-to-rear direction of the vehicle so that a rear end of the slanted surface is lower than a front end of the slanted surface; and a vehicle body side slide member fixed to the body member, the vehicle body side slide member engaging the rear end of the slanted surface.

According to this embodiment, the upper side of the pedal bracket is moved downwardly while the pedal bracket is moved in the front-to-rear direction. This movement of the pedal bracket causes the pedal being moved in the rear-to-front direction.

Additionally, the slanted angle may be increased from the rear end toward the front end of the slanted surface.

The slanted surface may be a curved surface.

Additionally, the bracket side slide portion may include a rounded smooth surface connected to the rear end of the slanted surface, the rounded smooth surface moving ahead of the slanted surface when the pedal bracket moves in the front-to rear direction of the vehicle.

Further, the bracket side slide portion may include a flexible portion connected to the rear end of the slanted surface, the flexible portion moving ahead of the slanted surface when the pedal bracket moves in the front-to-rear direction of the vehicle so that the flexible portion is deformed when the flexible portion is pressed against the vehicle body sides slide member.

In another embodiment according to the present invention, the lever portion may be urged in a front-to-rear direction of the vehicle, and the pedal bracket includes:

a stopper limiting a movement of the pedal lever in the front-to-rear direction so that the pedal is positioned at a normal position; and a pressing portion limiting a pivotal movement of the lever portion in the front-to-rear direction when the lever portion moves further from the normal position in the front-to-rear direction beyond the stopper.

In this embodiment, the movement of the pedal in the front-to-rear direction is restricted by the pressing portion even when a front-to-rear movement of the pedal is large enough to depress the stopper in the front-to-rear direction.

In another embodiment according to the present invention, the guiding mechanism includes:

a vehicle body side slide member fixed to the body member, the vehicle side slide member having a slanted surface extending to a position under a lower end of a steering support supporting a steering shaft of the vehicle; and a bracket side slide portion formed on the pedal bracket, the bracket side slide portion being engaged with the slanted surface so that the bracket side slide portion slides along the slanted surface when the pedal bracket is moved in a front-to-rear direction of the vehicle.

In another embodiment according to the present invention, at least an upper portion of the pedal bracket may be offset from a steering support supporting a steering shaft of the vehicle in a direction of width of the vehicle.

Other objects, features and advantages of the present invention will become more apparent from the following detailed description when read in conjunction with the accompanying drawings.

DETAILED DESCRIPTION OF THE PREFERRED EMBODIMENTS

Figure 1:
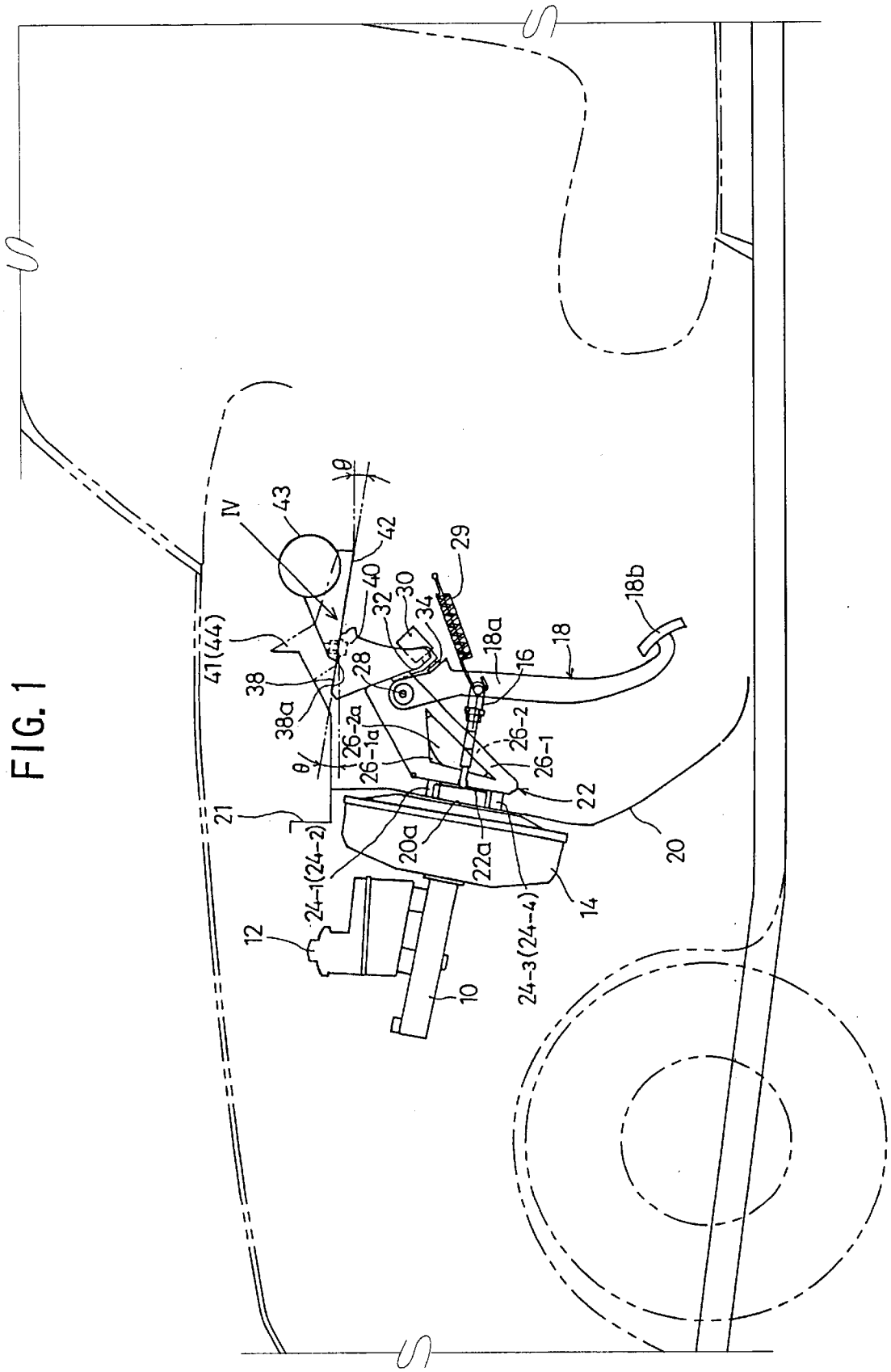
FIG. 1 is a side view of a pedal supporting structure for a vehicle according to a first embodiment of the present invention.

A description will now be given, with reference to FIGS. 1 to 6, of a first embodiment of the present invention. FIG. 1 is a side view of a pedal supporting structure for a vehicle 1 according to the first embodiment of the present invention. The pedal supporting structure shown in FIG. 1 includes a master cylinder 10, a reservoir tank 12, a brake booster 14, a depression force transmitting shaft 16 and a brake pedal 18. An end of the depression force transmitting shaft 16 is connected to the brake booster 14. The opposite end of the depression force transmitting shaft 16 is connected to a lever portion 18a of the brake pedal 18. The brake pedal includes the lever portion 18a and a pedal portion 18b fixed on the lower end of the lever portion 18a.

The brake booster 14 is mounted on the engine compartment side of a dash panel 20. The dash panel 20 extends downwardly from a cowl plate 21 so as to separate a passenger compartment from the engine compartment. The dash panel 20 has a through opening 20a having a predetermined diameter in a position corresponding to the center of the brake booster 14. The brake booster 14 and the depression force transmitting shaft 16 are connected via the through opening 20a.

A pedal bracket 22 is fixed on the passenger compartment side of the dash panel 20. The pedal bracket 22 has a through opening 22a having a diameter substantially equal to the diameter of the through opening 20a of the dash panel 20. The pedal bracket 22 is provided so that the depression force transmitting shaft 16 extends through the through opening 22a and is connected to the brake booster 14. The brake booster 14 and the pedal bracket 22 are mounted on the dash panel 20 by four common bolts 24-1 to 24-4.

The bracket 22 includes two side walls 26-1 and 26-2 which are oppositely arranged with a predetermined distance between each other. A pivot shaft 28 of the brake pedal 18 extends between the side walls 26-1 and 26-2. The pivot shaft 28 is connected to the side walls 26-1 and 26-2 at the respective ends thereof. The upper end of the lever portion 18a of the brake pedal 18 is pivotally supported by the pivot shaft 28.

A return spring 29 is engaged with the lever portion 18a of the brake pedal 18. The return spring 29 pulls the brake pedal 18 in a rearward direction of the vehicle. The brake pedal 28 is maintained at a rearward position as shown in FIG. 1 by the pulling force of the return spring 29 when no depression force is applied to the pedal portion 18b of the brake pedal 18. When the depression force is applied to the pedal portion 18b, the brake pedal 18 pivots about the pivot shaft 28 in the forward direction of the vehicle.

Figure 2:
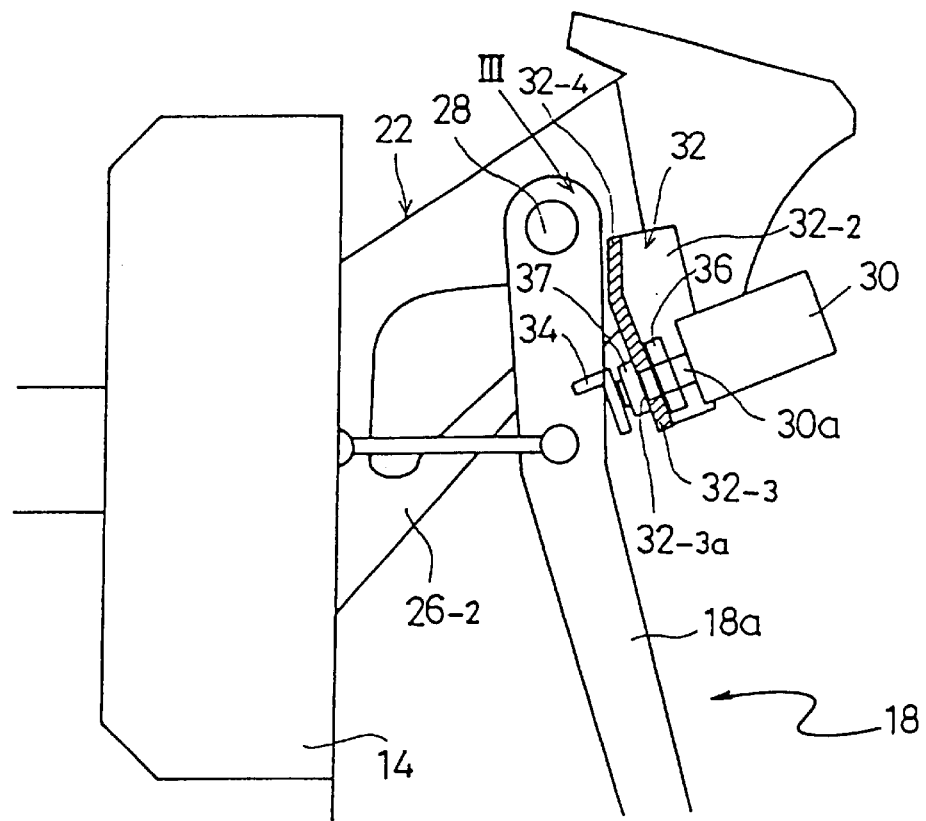
FIG. 2 is an enlarged view of a portion of the pedal supporting structure shown in FIG. 1.
Figure 3:
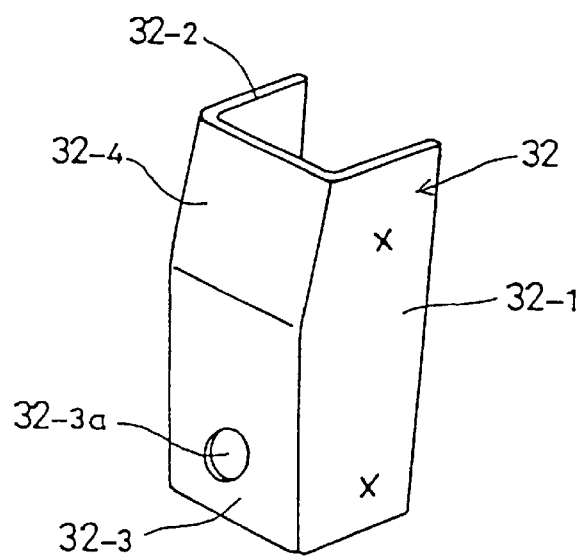
FIG. 3 is a perspective view of a stopper plate viewed in a direction indicated by an arrow III in FIG. 2.

A brake switch 30 and a stopper plate 32 are mounted to the pedal bracket 22. A contacting member 34 is mounted to a lever portion 18a of the brake pedal 18. FIG. 2 is an enlarged view of a portion of the pedal supporting structure including the brake switch 30, the stopper plate 32 and the contacting member 34. FIG. 3 is a perspective view of the stopper plate 32 viewed in a direction indicated by an arrow III in FIG. 2.

As shown in FIG. 3, the stopper plate 32 has two side walls 32-1 and 32-2, a stopper portion 32-3 and a pressing portion 32-4. The stopper portion 32-3 and the pressing portion 32-4 extend between the side walls 32-1 and 32-2. The stopper portion 32-3 is provided with a through opening 32-3a. The stopper portion 32 is fixed to the pedal bracket 22 by spot welding at two points indicated by x in FIG. 3

As shown in FIG. 2, the brake switch 30 has a movable contact point 30a. The brake switch 30 is secured to the stopper plate 32 by nuts 36 and 37 so that the movable contact point 30a protrudes through the through opening 32-3a and faces the lever portion 18a of the brake pedal 18. The brake switch 30 is turned off when the movable contact point 30a contacts the contacting member 34. The brake switch 30 is turned on when the movable contact point 30a is separated from the contacting member 34.

A movement of the brake pedal 18 relative to the pedal bracket 22 in the rearward direction of the vehicle is restricted by the contacting member 34 contacting the movable contact point 30a. The stopper plate 32 is positioned so that the pressing portion 32-4 is slightly away from the lever portion 18a when the brake pedal 18 is at the rearward end.

Figure 4:
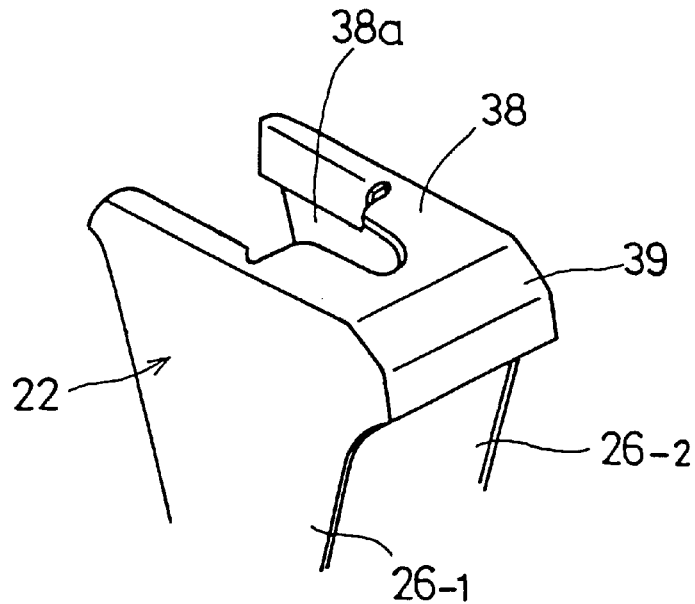
FIG. 4 is a perspective view of the upper end of a pedal bracket viewed in a direction indicated by an arrow IV of FIG. 1.

FIG. 4 is a perspective view of the upper end of the pedal bracket 22 viewed in a direction indicated by an arrow IV of FIG. 1. As shown in FIG. 4, the pedal bracket 22 has a bracket side slide surface 38 and a smooth surface 39 between the side walls 26-1 and 26-2. The bracket side slide surface 38 has a slot 38a which extends in the front-to-rear direction of the vehicle. The front side of the slot 38a is open, and the rear side of the slot 38a is closed. The smooth surface 39 is curved so that the rear side of the smooth surface 39 extends downwardly.

As shown in FIG. 1, the pedal bracket 22 is connected to a vehicle body side slide member 41 by a bolt 40 which is inserted into the rear end of the slot 38a. The vehicle body side slide member 41 is fixed to an inner panel reinforcing member 43 which supports a steering shaft. A slanted surface 42 is formed on a bottom portion of the vehicle body side slide member 41. The slanted surface 42 is inclined by an angle θ with respect to the horizontal plane of the vehicle so that the rear end of the slanted surface 42 is lowered. Similarly, the bracket side slide surface 38 is inclined by the angle θ with respect to the horizontal plane of the vehicle so that the rear end of the bracket side slide surface 38 is lowered.

The bolt 40 securing the pedal bracket 22 to the vehicle body side slide member 41 can be disengaged from the slot 38a when the pedal bracket 22 moves rearwardly and downwardly at the angle θ relative to the vehicle body side slide member 41. That is, the bolt 40 can be disengaged from the slot 38a when the bracket side slide surface 38 slides on the slanted surface 42 of the vehicle body side slide member 41. When the bolt 41 is disengaged from the slot 38a, the engagement between the pedal bracket 22 and the vehicle body side slide member 41 is released. After that, the pedal bracket 22 can be moved relative to the vehicle body side slide member 41. Hereinafter, the direction defined by the angle θ is referred to as a slanted direction θ.

In the pedal supporting structure, the pedal bracket 22 must be sufficiently rigid so as to support the brake pedal 18 in a stable manner. Accordingly, when the pedal bracket 22 is fixed to only the dash panel 20 by the four bolts 24-1 to 24-4, the pedal bracket 22 must be formed with a rigid structure. However, according to the present embodiment, the pedal bracket 22 is secured to the vehicle body side slide member 41 at the upper end thereof. This construction provides sufficient rigidity to the pedal bracket 22 without the pedal bracket 22 itself being rigid. Thus, the weight of the pedal bracket 22, which is provided in the pedal supporting structure according to the present embodiment, can be reduced as compared to a case in which the pedal bracket 22 is secured only to the dash panel 20.

If a large force is exerted on the front end of the vehicle using the pedal supporting structure according to the present embodiment in the front-to-rear direction of the vehicle, the master cylinder 10, the brake booster 14 and the pedal bracket 22 may be pressed rearwardly. In such a case, the pedal bracket 22 moves rearwardly while the bracket side slide surface slides on the slanted surface 42 of the vehicle body side slide member 41.

In this case, the moving direction of the upper end of the pedal bracket 22 is restricted to the slanted direction θ. This allows the bolt 40 to be disengaged from the slot 38a. Thus, the pedal bracket 22 can be moved in the slanted direction θ without restriction of bolt 40 when a large force is exerted on the front end of the vehicle.

Figure 5:
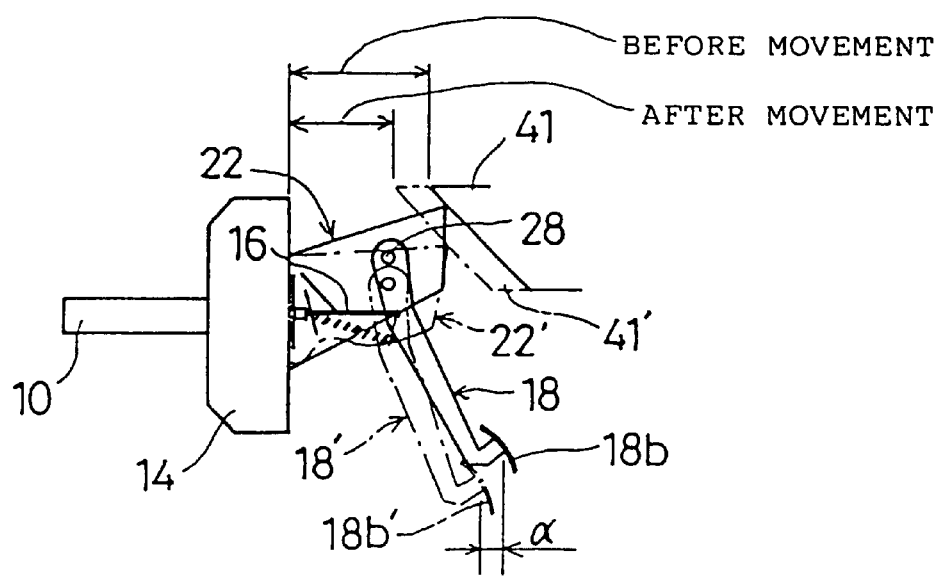
FIG. 5 is a side view of brake pedal movement when a large force is exerted on the front end of the vehicle.

FIG. 5 is a side view of the brake pedal movement when a large force is exerted on the front end of the vehicle. The movement of the brake pedal is caused due to the restriction of the depression force transmitting shaft 16 and the pivot shaft 28. When a large force is exerted on the front end of the vehicle as mentioned above, the upper end of the pedal bracket 22 moves in the slanted direction θ due to the vehicle body side slide member 41. As a result, the pedal bracket 22 moves from a position indicated by solid lines to a position indicated by dashed lines in FIG. 5. That is, the pedal bracket 22 is supported in the position indicated by the solid lines before the pedal bracket 22 is moved. The pedal bracket 22 is moved from that position to the position indicated by the dashed lines (indicated as 22').

Due to the movement of the pedal bracket 22 as mentioned above, the brake pedal 18 pivots about the pivot shaft 28 as shown in FIG. 5. As a result, the brake pedal 18 moves from a position indicated by solid lines to a position indicated by dashed lines in FIG. 5. That is, the brake pedal 18 is supported in the position indicated by the solid lines before the pedal bracket 22 is moved. The brake pedal 18 is moved from that position to the position indicated by the dashed lines (indicated as 18').

In the process where the brake pedal 18 moves as mentioned above, the pedal portion 18b of the brake pedal 18 moves forwardly by a distance α as shown in FIG. 5. That is, the pedal portion 18b of the brake pedal 18 is moved in the forward direction by the distance α when the movement of the brake pedal 18 is restricted by the depression force transmitting shaft 16 and the pivot shaft 28 since the pedal bracket 22 moves rearwardly relative to the vehicle body side slide member 41.

Accordingly, a large space can be maintained in the foot space associated with the driver's seat or side of the vehicle. Thus, the pedal supporting structure according to the present embodiment is advantageous to protect the driver's knee from a shock when a large force is exerted on the front end of the vehicle such as an occurrence of a front end crash.

In order to provide a larger foot space when a large force is exerted on the front end of the vehicle, it is advantageous to increase the distance α as much as possible. In order to increase the distance α, the larger the displacement of the pedal bracket 22 the better. The displacement of the pedal bracket 22 is maximized when the whole or entire movement of the pedal bracket 22 is effectively directed by the downward movement of the upper end of the pedal bracket 22.

In the pedal supporting structure according to the present embodiment, the direction of movement of the pedal bracket 22 is restricted to the slanted direction e from the time when the bolt 40 is disengaged from the pedal bracket 22. Thus, the entire process of movement of the pedal bracket 22 is directed to the downward movement of the pedal bracket 22. This means that, in the pedal supporting structure according to the present embodiment, the pedal bracket 22 is moved downwardly with a large distance in the process of movement of the pedal bracket 22.

Thus, in the present embodiment, a larger space can be maintained in a foot space associated with the driver's seat or side as compared to a construction in which the movement of the pedal bracket 22 when the bolt 40 is disengaged from the pedal bracket 22 is not restricted to the downward direction.

Referring again to FIG. 2, the pedal supporting structure according to the present embodiment, the stopper portion 32-3 and the pressing portion 32-4 are fixed to the pedal bracket as mentioned above. Additionally, the rear end position of the brake pedal 18 is restricted by the position where the contacting member 34 contacts the movable contact point 30 fixed to the stopper 32-3. In this construction, movement of the brake pedal 18 in the front-to-rear direction of the vehicle is restricted by a restriction force determined by a strength of the stopper portion 32-3.

If the brake pedal 18 is pressed against the stopper portion 32-3 with a force exceeding the strength of the stopper portion 32-3, the stopper plate 32 is deformed in a portion at or near the stopper portion 32-3. If the stopper plate 32 is deformed, an upper portion of the brake pedal 18 contacts the pressing portion 32-4 of the stopper plate 32. As the deformation of the stopper plate 32 progresses, the contacting area between the brake pedal 18 and the pressing portion 32-4 is increased. In this case, the rearward movement of the brake pedal 18 is restricted by a restriction force which corresponds to the strength of the stopper portion 32-3, the strength of the pressing portion 32-4 and the size of the contacting area between the brake pedal 18 and the pressing portion 32-4. Thus, in the pedal supporting structure according to the present embodiment, when the upper end of the pedal bracket 22 moves downwardly, the brake pedal 18 moves in accordance with the restriction of the pivot shaft 28 and the stopper plate 32.

Figure 6:
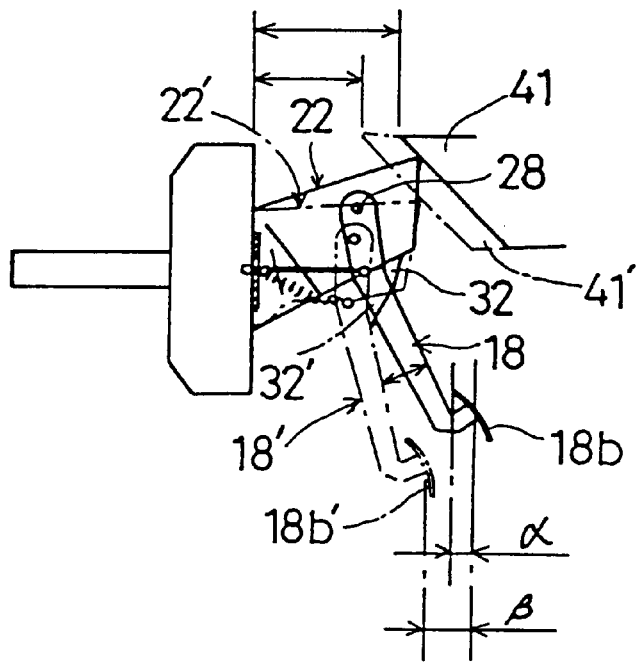
FIG. 6 is a side view of brake movement when a large force is exerted on the front end of the vehicle, the movement of the brake pedal being restricted by the stopper plate.

FIG. 6 is a side view of the movement of the brake pedal 18 when a large force is exerted on the front end of the vehicle. The movement of the brake pedal is due to the restriction of the depression force transmitting shaft 16 as shown on FIG. 1, the pivot shaft 28 and the stopper plate 32. As shown in FIG. 6, when the movement of the brake pedal 18 is subjected to the restriction of the pivot shaft 28 and the stopper plate 32, the pedal portion 18b of the brake pedal 18 is moved forwardly by a distance β. The distance β is relatively large as compared to the distance α which is obtained when the movement of the brake pedal 18 is restricted by the depression force transmitting shaft 16 and the pivot shaft 28.

The stopper portion, as shown in FIG. 2, serves as a member to restrict the movement of the brake pedal 18 at the rear end position against the pulling force of the return spring 29 as shown in FIG. 1. Thus, the stopper portion 32-3 does not require a rigid structure. It is not preferable to provide unnecessary rigidity to the stopper portion since it would prevent a reduction in the weight of the pedal supporting structure.

Conventionally, as a member for restricting the brake pedal 18 at the rear end position, a stopper plate, including the stopper portion 32-3 and the side walls 32-1 and as shown in FIG. 2, is used. The stopper portion of the conventional stopper plate is not rigid because of the above-mentioned reason. Thus, in the conventional construction, the movement of the brake pedal is restricted mainly by the depression force transmitting shaft 16 and the pivot shaft 28.

On the other hand, in the pedal supporting structure according to the present embodiment, the stopper plate 32 includes the pressing portion, as shown in FIG. 2, in addition to the stopper portion 32-3 and the side walls 32-1 and 32-2. Thus, the brake pedal 18 is moved by a large distance as compared to the conventional pedal supporting structure so that a large foot space is preserved to protect the driver when a large force is exerted on the front end of the vehicle.

Additionally, the pedal bracket 22 has the curved smooth surface 39 on the rear end of the bracket side slide surface 38, as shown in FIG. 4. The smooth surface 38 moves ahead of the bracket side slide surface 38 when the pedal bracket 22 moves rearwardly.

The pedal bracket 22 moves rearwardly when a large force is exerted on the front end of the vehicle. Under such a condition, there is a possibility that an unexpected member protrudes in the moving direction of the pedal bracket 22 while the pedal bracket 22 is moved rearwardly. That is, there is a possibility that the rearward movement of the pedal bracket 22 is stopped due to engagement with the unexpected member. In such a case, the upper end of the pedal bracket 22 cannot be moved downwardly, and the pedal portion 18b of the brake pedal 18 cannot be properly moved in the forward direction.

Since the surface 39 of the pedal bracket 22 is smooth and curved, the smooth surface 39 hardly engages with the unexpected member protruding in the moving direction of the pedal bracket 22. That is, the rearward and downward movement of the pedal bracket is hardly blocked by the unexpected protruding member. Thus, in the pedal supporting structure according to the present invention, the frontward movement of the pedal portion 18b of the brake pedal 18 is assured when a large force is exerted on the front end of the vehicle.

In the above-mentioned embodiment, the pressing portion 32-4 of the stopper plate 32 is provided between the contacting member 34 as shown in FIG. 2, and the pivot shaft 28. However, the present invention is not limited to this construction, and the pressing portion 32-4 may be provided under the contacting portion 34.

Additionally, in the above-mentioned embodiment, although the vehicle body side slide member 41 is mounted on the inner panel reinforcing member 43, as shown in FIG. 1 the support structure of the vehicle body side slide member 42 as shown in FIG. 1, is not limited to this structure. For example, as shown by a vehicle body side slide plate 44 which is indicated by dashed lines in FIG. 1, the vehicle body side slide plate 41 (44) may be supported by the cowl plate 21 as shown in FIG. 4.

Figure 7:
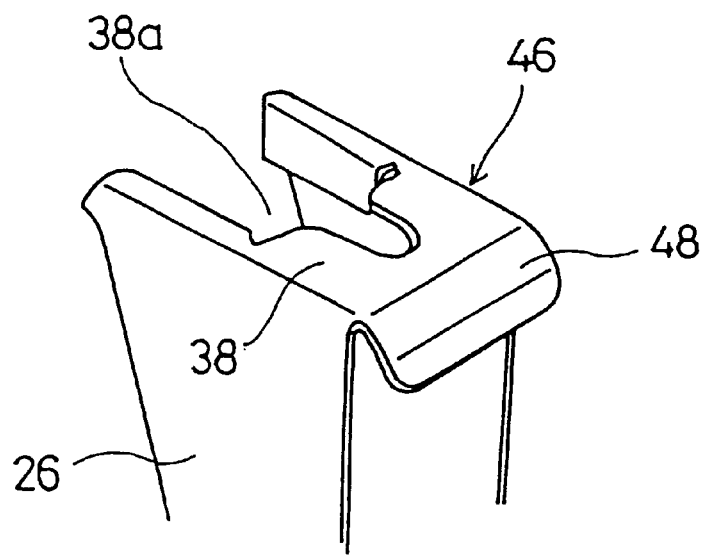
FIG. 7 is a perspective view of a pedal bracket used in a pedal supporting structure according to a second embodiment of the present invention.

A description will now be given, with reference to FIG. 7, of a pedal supporting structure according to a second embodiment of the present invention. FIG. 7 is a perspective view of a pedal bracket 46 used in the pedal supporting structure according to the second embodiment of the present invention. In FIG. 7, parts that are the same as the parts shown in FIG. 4 are given the same reference numerals, and description thereof will be omitted.

The pedal supporting structure according to the present embodiment uses the pedal bracket 46 instead of the pedal bracket 22 of the first embodiment. The pedal bracket 46 has a deformable portion 48 instead of the smooth surface 39 of the first embodiment. Similar to the smooth surface 39 of the first embodiment, the deformable portion 48 is provided on the rear end of the bracket side slide surface 38. Thus, the deformable portion 48 moves ahead of the bracket side slide surface 38 when the pedal bracket moves rearwardly.

The deformable portion 48 is formed of a relatively soft material so that the deformable portion 48 can be easily deformed. That is, the deformable portion 48 deforms when the pedal bracket 46 hits an unexpected member protruding in a path of the rearward movement of the pedal bracket 22 so as to prevent the rearward movement of the pedal bracket from being stopped by the unexpected member. Thus, the frontward movement of the brake pedal 18 as shown in FIG. 1, is assured when a large force is exerted on the front end of the vehicle.

Figure 8:
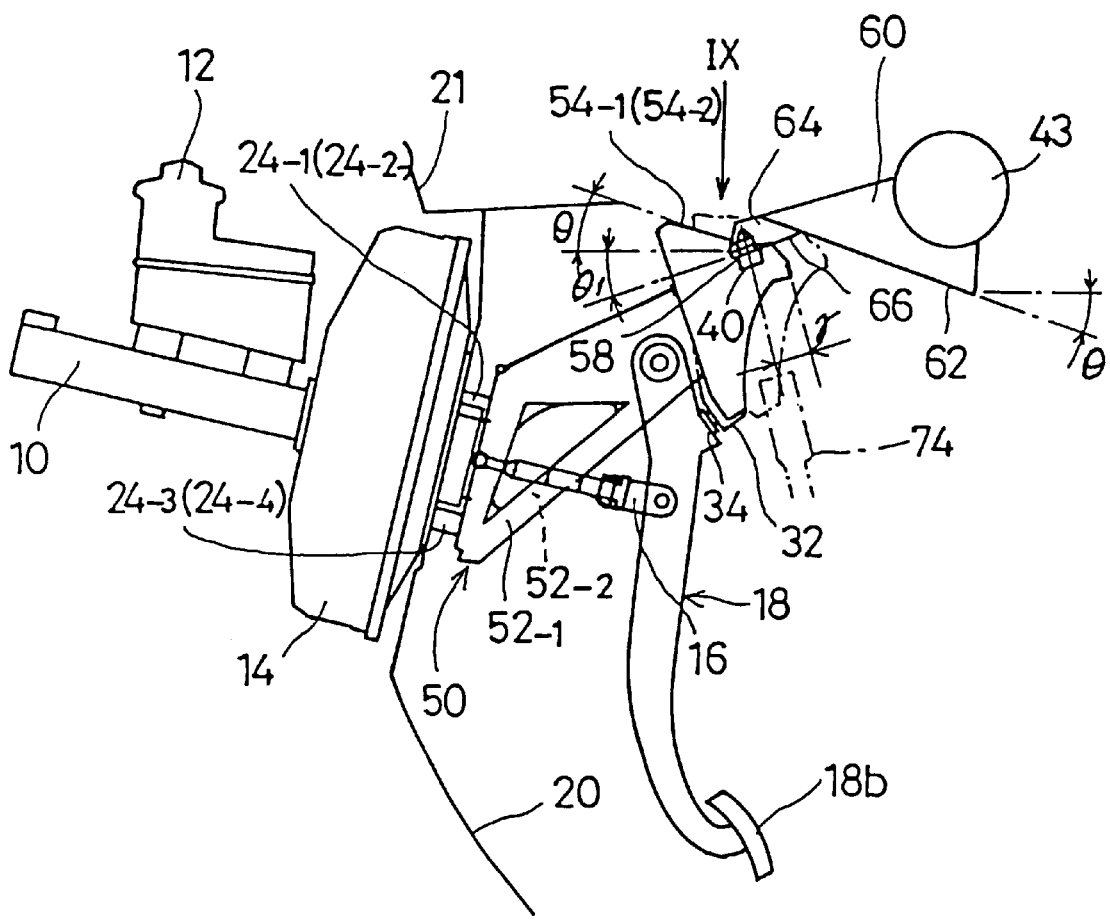
FIG. 8 is a side view of a pedal supporting structure according to a third embodiment of the present invention.

A description will now be given, with reference to FIGS. 8–10, of a pedal supporting structure according to a third embodiment of the present invention. FIG. 8 is a side view of the pedal supporting structure according to the third embodiment of the present invention. In FIG. 8, parts that are the same as the parts shown in FIG. 1 are given the same reference numerals, and description thereof will be omitted.

The pedal supporting structure according to the present embodiment uses a pedal bracket 50 instead of the pedal bracket 22 of the first embodiment. The pedal bracket 50 has two side walls 52-1 and 52-2. FIG. 9 is a plane view of the pedal bracket 50 viewed in a direction indicated by an arrow IX in FIG. 8. As shown in FIG. 9, the bracket 50 has bracket side slide portions 54-1 and 54-2, a slot 56 and the smooth surface 39 between the side walls 52-1 and 52-2. The bracket side slide portions 54-1 and 54-2 extend in a longitudinal direction of the vehicle. As shown in FIG. 8, the bracket side slide portions 54-1 and 54-2 are slanted by the slanted angle e with respect to the horizontal plane of the vehicle when the pedal bracket 50 is in a normal position.

Figure 9:
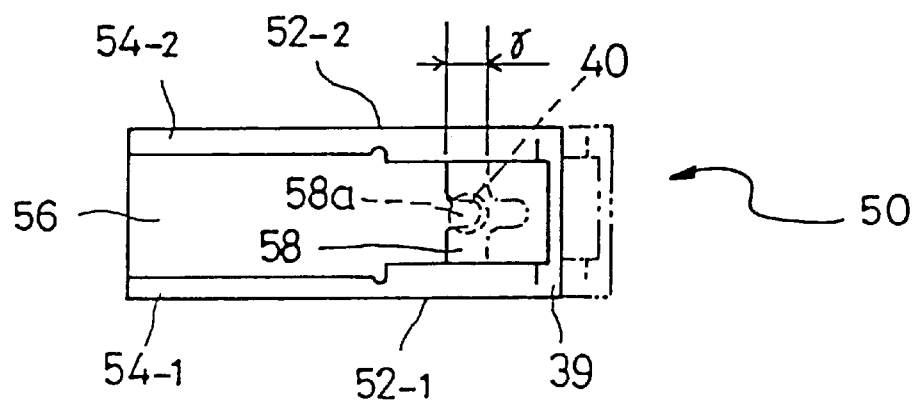
FIG. 9 is a plan view of a pedal bracket used in the third embodiment according to the present invention viewed in a direction indicated by an arrow IX in FIG. 8.

As shown in FIG. 9, a bolt connection portion 58 is formed within the slot 56. The bolt connection portion 58 has a slit 58a which opens toward the front end of the vehicle when the pedal bracket is assembled in the vehicle. The rear end of the slit 58a is closed. As shown in FIG. 8, the bolt connection portion 58 is slanted by a predetermined angle $\theta 1$ with respect to the horizontal plane of the vehicle so that the rear end of the bolt connection portion 58 extends upwardly.

Additionally, the pedal supporting structure according to the present invention uses a vehicle body side slide member 60 instead of the vehicle body side slide member 41 of the first embodiment. The vehicle body side slide member 60 has a slanted surface 62 on a bottom portion. The slanted surface 62 is fixedly slanted by the slanted angle $\theta$. The vehicle body side slide member 60 has a bolt connection portion 64 which protrudes from the slanted surface 62 in a forward and downward direction of the vehicle. A slanted surface 66 is formed on a bottom of the bolt connection portion 64. The slanted surface 66 is fixedly slanted by the predetermined angle $\theta 1$ so that the rear end of the slanted surface 66 extends upwardly.

The pedal bracket 50 and the vehicle body side slide member 60 are secured to each other by the bolt 40. The bolt 40 is inserted into the slit 58a, as shown in FIG. 9, of the bolt connection portion 58 from underneath the pedal bracket 50, and is screwed into the bolt connection portion 64 of the vehicle body side slide member 60. The pedal bracket 60, which is mounted to the vehicle body side slide member 60 via by the bolt 40, can be moved rearwardly and upwardly by a distance $\tau$ in the direction of angle $\theta 1$ relative to the vehicle body side slide member 60. On the other hand, the slit 58a of the pedal bracket 50 is configured so that a head of the bolt 40 is disengaged from the slit 58a when the pedal bracket 50 moves the distance τ.

Accordingly, when the pedal bracket 50 is moved from a state where the pedal bracket 50 is connected to the vehicle body side slide member 60 by the bolt 40 as shown by solid lines in FIG. 8 to a state where the pedal bracket 50 is moved by a distance τ as shown by dashed lines in FIG. 8, the bolt 40 is disengaged from the slit 58a. As a result, the engagement between the pedal bracket 50 and the vehicle body side slide member 60 is released.

After the engagement between the pedal bracket 50 and the vehicle body side slide member 60 is released, a relatively large movement is allowed for the pedal bracket 50 relative to the vehicle body side slide member 60. In such a condition, the direction of the movement of the upper end of the pedal bracket 50 is restricted to the slanted direction θ since the bracket side slide portions 54-1 and 54-2 of the pedal bracket 50 slide on the slanted surface 62 of the vehicle body side slide member 60.

If the upper end of the pedal bracket 50 is moved downwardly when the pedal bracket 50 is moved rearwardly as mentioned above, the pedal portion 18b of the brake pedal 18 can be moved forwardly relative to the pedal bracket 50. Thus, similar to the above-mentioned first and second embodiments, a large foot space can be preserved when a large force is exerted on the front end of the vehicle irrespective of the pedal bracket 50 being moved rearwardly.

When a large force is exerted on the front end of the vehicle in the front-to-rear direction, the force (energy) is transmitted to the pedal bracket 50 via component parts such as an engine and a frame member (not shown). A description will now be given, with reference to FIG. 10, of the force transmitted to the pedal bracket 50 of FIGS. 8 and 9.

Figure 10:
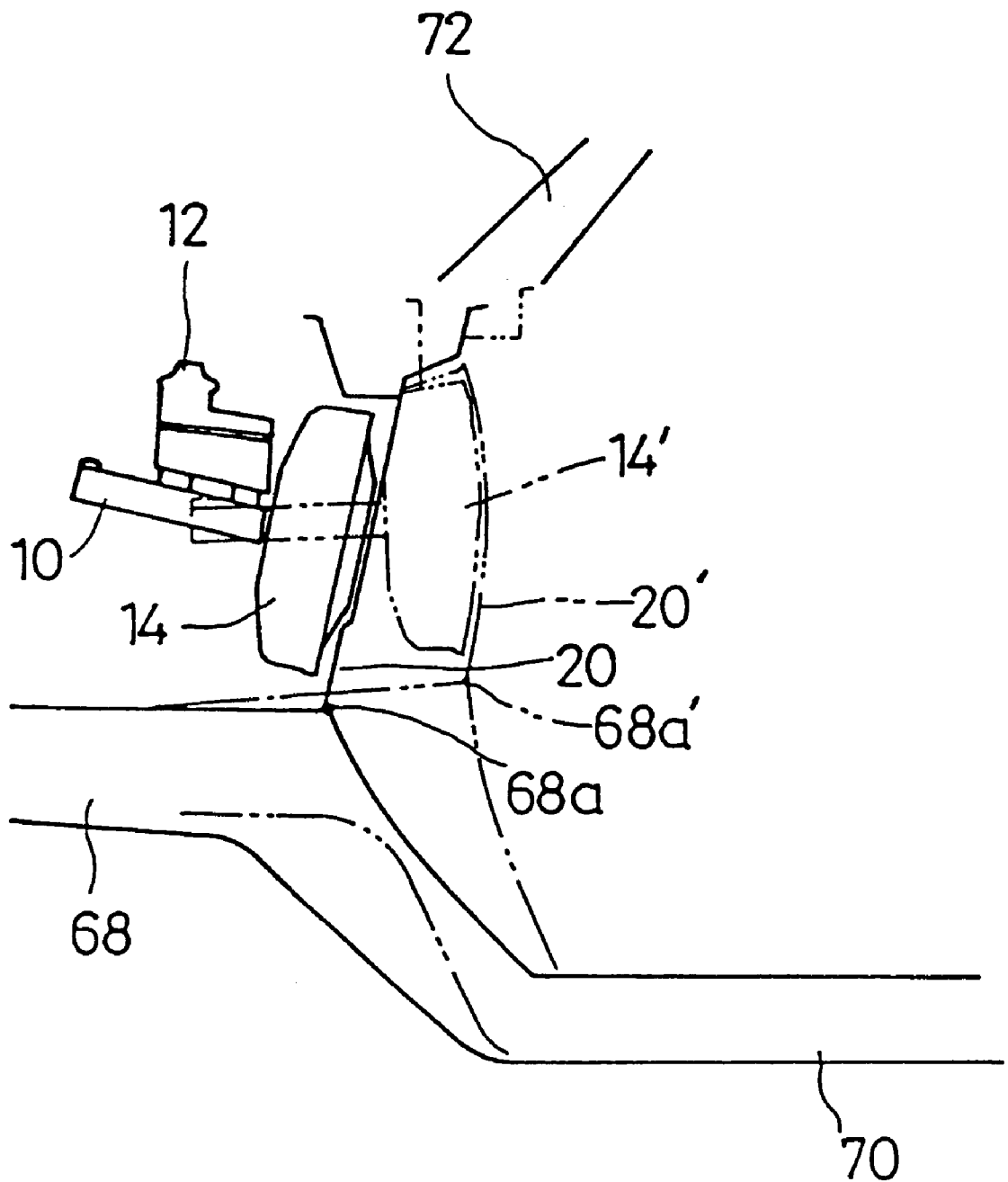
FIG. 10 is a side view of master cylinder and brake booster movement when a large force is exerted on a front end of a vehicle.

FIG. 10 is a side view of the movement of the master cylinder 10 and the brake booster 14 when a large force is exerted on the front end of the vehicle. In FIG. 10, solid lines indicate a state before a large force is exerted on the vehicle, and dashed lines indicate a state after a large force is exerted on the vehicle.

A side member 68 and a rocker 70 are members constituting the frame of the vehicle. The side member 68 extends in front of the passenger compartment. On the other hand, the rocker 70 extends under the passenger compartment. Accordingly, an offset is provided between the side member 68 and the rocker 70 in the vertical direction. Additionally, a front pillar 72, which is a part of an upper body, extends above the passenger compartment. An upper end of the dash panel 20 to which the brake booster 14 is mounted is secured near the front pillar 72, and a lower end of the dash panel 20 is secured near the side member 68.

When a large force is exerted from the front-to-rear direction of the vehicle, a portion of the force (energy) is transmitted to the side member 68. Accordingly, the side member is moved rearwardly. In this case, since the side member is offset from the rocker 70, the rear end 68a of the side member 68 moves rearwardly and upwardly as shown by the dashed lines and reference numeral 68a in FIG. 10.

During the process in which the rear end of the side member 68 moves from the position indicated by 68a to the position indicated by 68b, the dash panel 20 moves to a position indicated by the dashed chains and reference numeral 20'. As shown in FIG. 10, the upper end of the dash panel 20 is not moved as much as the movement of the lower end of the dash panel 20. As a result, the brake booster 14 moves in an upward and rearward direction. A position of the brake booster 14 after the movement is indicated by the dashed lines and reference numeral 14'.

As mentioned above, when a large force is exerted on the front end of the vehicle, the brake booster is moved in the rearward and upward direction of the vehicle. Accordingly, a movement of the pedal bracket 50, which is mounted to the dash panel 20 together with the brake booster 14, is also in the rearward and upward direction.

In the pedal supporting structure according to the present embodiment, as mentioned above, the bolt 40, as shown in FIG. 8 is disengaged from the vehicle body side slide member 60, as shown in FIG. 8, when the pedal bracket 50 moves in the rearward and upward direction, that is, in the direction θ1 relative to the vehicle body side slide member 60 as shown in FIG 8. Accordingly, in the present embodiment, the engagement between the pedal bracket 50 and the vehicle body side slide member 60 is released by the movement of the pedal bracket 50 in the same direction as the movement of the pedal bracket caused by a large force exerted on the front end of the vehicle. Thus, the pedal bracket 50 is positively disengaged from the vehicle body side slide member 60 when a large force is exerted on the front end of the vehicle, resulting in a positive forward movement of the pedal portion 18b of the brake pedal 18 as shown in FIG. 8.

The pedal bracket 50 and the vehicle body side slide member 60 are assembled under the cowl plate 21, as shown in FIG. 8, after the cowl plate 21 is assembled to the vehicle body. Thus, the bolt 40, which engages the pedal bracket 50 and the vehicle body side slide member 60 is inserted from under the pedal bracket 50. However, located under the bolt connection portion 58 as shown in FIGS. 8 and 9, of the pedal bracket 50 is the stopper bracket 32 as shown in FIG. 8. Thus, the fastening operation of the bolt 40 must be performed while avoiding interference with the stopper plate 32.

In the present embodiment, the fastening operation of the bolt 40 can be performed with a socket wrench 74 (refer to FIG. 8) accessing the bolt 40 from under the pedal bracket 50. When the socket wrench 74 accesses the head of the bolt 40, an operator must avoid interference between the socket wrench 74 and the stopper plate 32. In this respect, it is advantageous that the longitudinal axis of the bolt 40 is inclined counterclockwise when it is assembled as much as possible.

In the present embodiment, both the bolt connection portion 58 of the pedal bracket 50 and the bolt connection portion 64 of the vehicle body side slide member 60 are slanted by the angle θ1 in the counterclockwise direction as shown in FIG. 8. Thus, the bolt 40 is assembled with the longitudinal direction thereof slanted by the angle θ1 in the counterclockwise direction. Thus, in the pedal supporting structure according to the present embodiment, there is an effect that an easy assembling operation of the pedal supporting structure is achieved in addition to the effect that the pedal portion 18b of the brake pedal can be positively moved forward when a large force is exerted on the front end of the vehicle.

Figure 11:
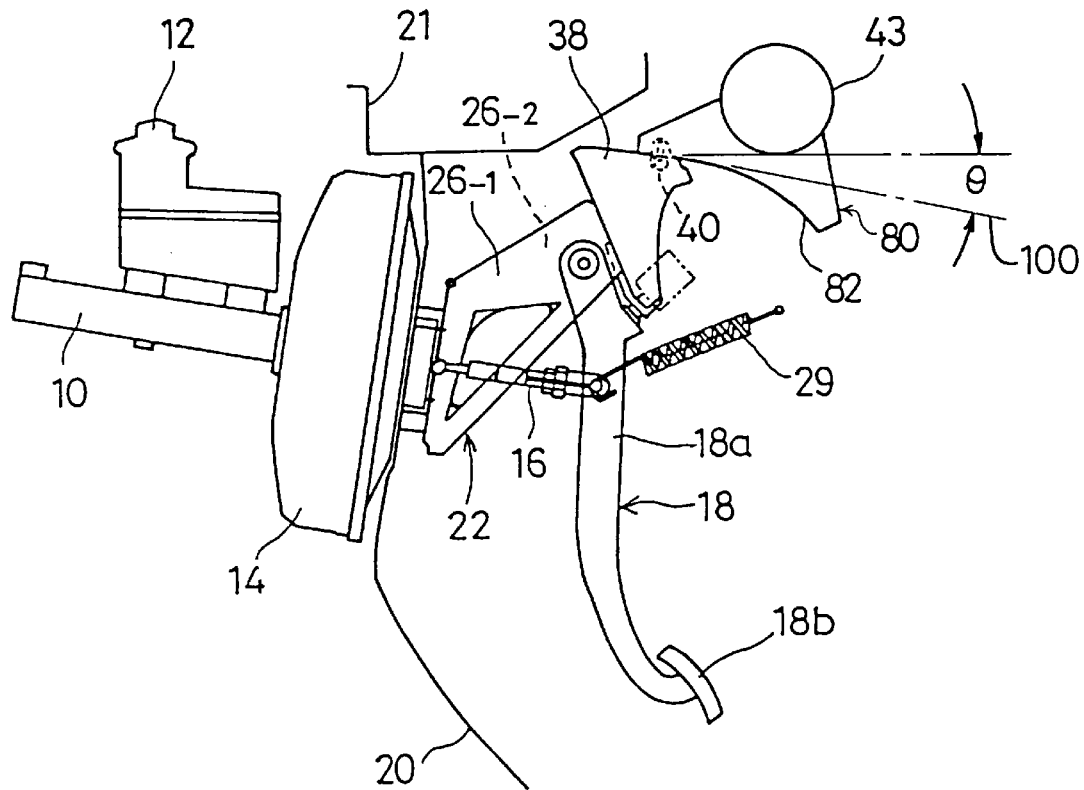
FIG. 11 is a side view of a pedal supporting structure according to a fourth embodiment of the present invention.

A description will now be given, with reference to FIGS. 11 to 13, of a fourth embodiment of the present invention. FIG. 11 is a side view of a pedal supporting structure according to the fourth embodiment of the present invention. In FIG. 11, parts that are the same as the parts shown in FIG. 1 are given the same reference numerals, and descriptions thereof will be omitted.

In the pedal supporting structure according to the present embodiment, a vehicle body side slide member 80 is used instead of the vehicle body side slide member 41 of the first embodiment. The vehicle body side slide member 80 has a slanted surface 82 on the bottom. The slanted surface 82 is curved in a configuration in which the front end is slightly slanted in the clockwise plane of the vehicle with respect to the horizontal direction and the rear end is greatly slanted in the clockwise direction with respect to the horizontal plane of the vehicle.

The vehicle body side slide member 80 is slightly engaged with the pedal bracket at the front end thereof. If the pedal bracket 22 is moved in the rearward direction due to a large force exerted on the front end of the vehicle, the engagement by the bolt 40 is released first. Then, the pedal bracket 22 moves rearwardly while the bracket side slide surface 38 of the pedal bracket 22 slides on the slanted surface 82 of the vehicle body side slide member 80.

Figure 12:
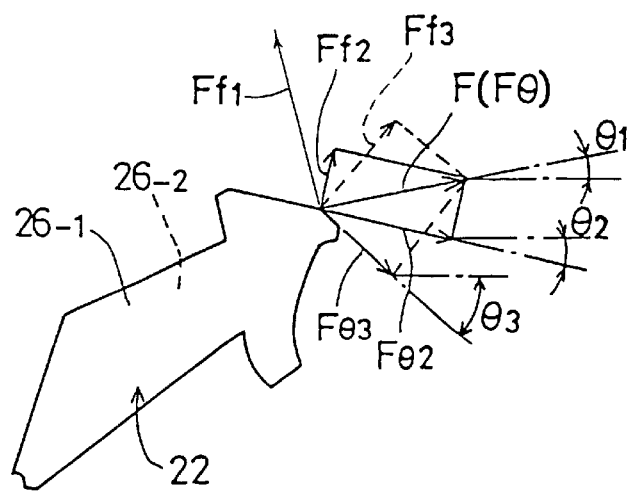
FIG. 12 is a diagram of force transmitted by a pedal bracket and forces generated between the pedal bracket and a vehicle body side slide member.

FIG. 12 is a diagram of force transmitted by the pedal bracket 22 and forces generated between the pedal bracket 22 and the vehicle body side slide member 80 of FIG. 11.

If a large force is exerted on the front end of the vehicle, a pressing force F is transmitted to the pedal bracket 22. The pressing force F acts in a rearward and upward direction of the vehicle. For the sake of convenience, the direction of the pressing force F in FIG. 12 is set to a direction inclined by the angle $\theta1$ in the counterclockwise direction.

Referring also to FIG. 11, when a tangent line 100 of the slanted surface 82 of the vehicle body side slide member 80 at a sliding contact point between the pedal bracket 22 and the vehicle body side slide member 80 is slanted by the angle $\theta$ (depicted as $\theta_1$, $\theta_2$ and $\theta_3$) in the clockwise direction with respect to the horizontal direction, a component force $F\theta$ (depicted as $F\theta_1$, $F\theta_2$ and $F\theta_3$) of the pressing force F in the direction $\theta$ acts on the pedal bracket 22 to slide on the slanted surface 82 of the vehicle body side slide member 80. On the other hand, a component force Ff depicted as $Ff_1$, $Ff_2$ and $Ff_3$ in a direction perpendicular to the direction $\theta$ acts to increase friction between the pedal bracket 22 and the vehicle body side slide member 80. That is, the component force Ff acts to prevent the sliding motion of the pedal bracket 22. Accordingly, in order to smoothly move the pedal bracket 22 in the rearward direction when a large force is exerted on the front end of the vehicle, it is preferable that the component force $F\theta$ is large and the component force Ff is small.

The component forces $F\theta$ and Ff shown in FIG. 12 correspond to component forces of the pressing force F in the direction $\theta$ and the direction perpendicular to the direction $\theta$, respectively, when the tangent line at the contact point between the pedal bracket 22 and the vehicle body side slide member 80 is slanted by the angle $\theta$. Additionally, indicated in FIG. 12 are component forces $F\theta3$ and $Ff3$ of the pressing force F generated when the above-mentioned tangent line is slanted by an angle $\theta3$ in the clockwise direction with respect to the horizontal direction, where the angle $\theta3$ is greater than the angle $\theta2$ ($\theta3>\theta2$).

As may be appreciated by FIG. 12, it is advantageous, where a smooth sliding motion of the movement is desired, that the tangent line corresponds to the direction $\theta2$ rather than the direction $\theta3$. That is, in order to achieve a smooth sliding motion of the pedal bracket 22 with respect to the vehicle body side slide member 80, the smaller the slanted angle of the tangent line at the contacting point between the pedal bracket 22 and the vehicle body side slide member 80 the better.

In the pedal supporting structure according to the present embodiment, the direction of movement of the pedal bracket 22 is different from the direction of the pressing force F since the movement of the pedal bracket 22 is restricted by the vehicle body side slide member 80. Accordingly, in order to move the pedal bracket 22 in a rearward and upward direction while it is slid on the vehicle body side slide member 80, it is necessary to appropriately deform the pedal bracket 22.

In order to provide such a deformation to the pedal bracket 22, a large force must be exerted on the pedal bracket until the pedal bracket 22 yields to that force. After the pedal bracket 22 yields, deformation of the pedal bracket 22 can progress with a relatively small force. Thus, it is preferred to provide a relatively large pressing force F to the pedal bracket 22 after the pressing force F begins to be transmitted to the pedal bracket 22 until the pedal bracket 22 starts to deform.

As shown in FIG. 11, according to the present embodiment, the pedal bracket 22 slidingly contacts the vehicle body side slide member 80 with a small angle $\theta$ of the tangent line of the slanted surface 82 before deformation is generated in the pedal bracket 22. Thus, a relatively large component force $F\theta$ and a relatively small component force Ff are generated at the upper end of the pedal bracket 22 after the pressing force F begins to be transmitted and until the pedal bracket 22 starts to deform. Thus, in the present embodiment, the deformation of the pedal bracket 22 to a predetermined shape can be initiated when a large force is exerted on the front end of the vehicle.

Figure 13:
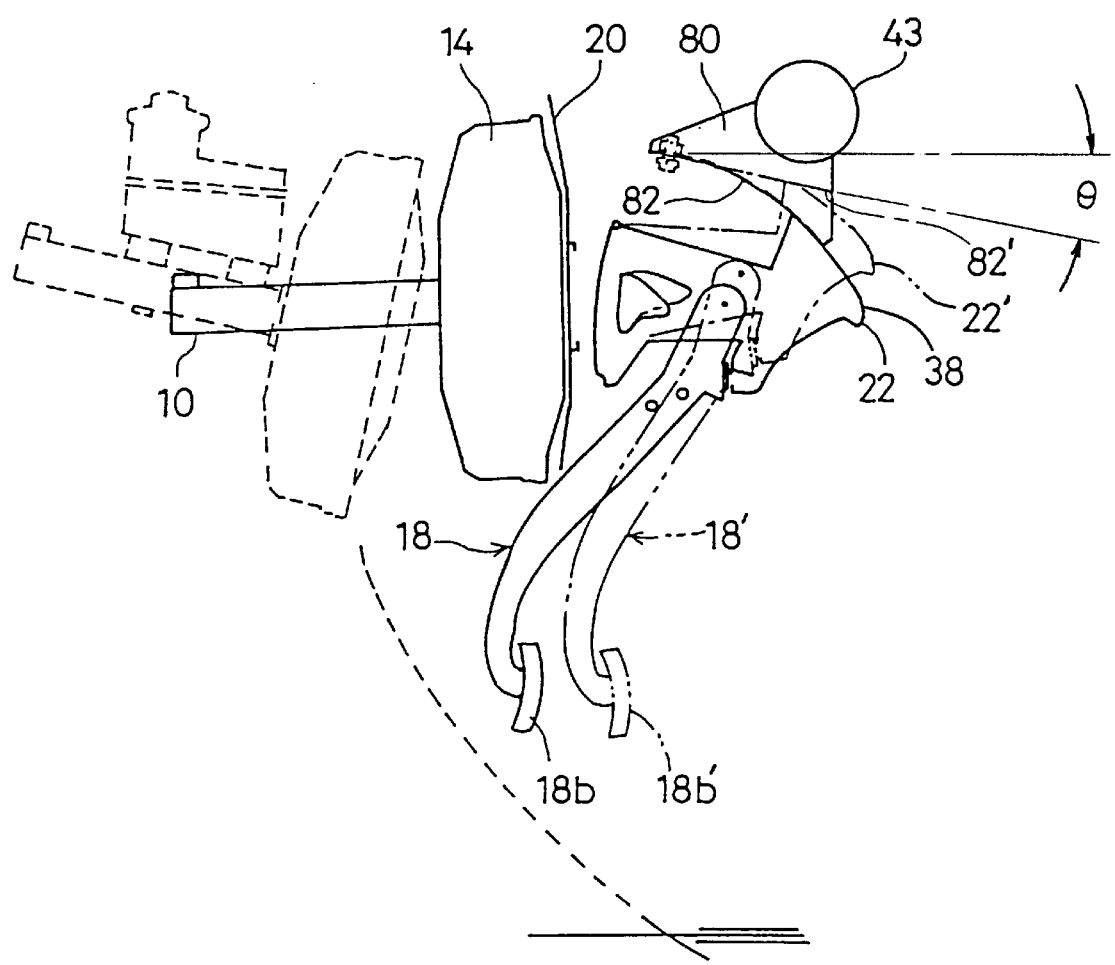
FIG. 13 is a side view of the pedal supporting structure motion prescribed by the curved slanted surface shown in FIG. 11.

FIG. 13 is a side view of the pedal supporting structure according to the fourth embodiment including a curved slanted surface 82.

When the slanted surface 82 is not curved, that is, when the slanted angle of the slanted surface 82 is constant as indicated by dashed line in FIG. 13, the pedal bracket 22 and the brake pedal 18 are moved to positions indicated by dashed lines and reference numerals 18' and 22' in FIG. 13 due to a movement of the master cylinder 10 and the brake booster 14 from that indicated by dashed lines to that indicated by solid lines. On the other hand, when the slanted surface 82 is curved as is in the present embodiment, the pedal bracket 22 and the brake pedal 18 are moved to positions indicated by solid lines in FIG. 13 due to the movement of the master cylinder 10 and the brake booster 14 from that indicated by dashed lines to that indicated by solid lines. A larger movement is generated in the brake pedal 18 when the slanted angle $\theta$ of the slanted surface 82 changes as compared to the case in which the slanted angle $\theta$ is constant.

When the slanted angle changes, the component force $F\theta$ of the pressing force F is decreased and the component force Ff is increased as the pedal bracket 22 moves in the rearward direction. Thus, if the slanted surface 82 is curved, friction between the pedal bracket 22 and the vehicle body side slide member 80 is increased as the pedal bracket 22 is moved rearward. This condition is disadvantageous in obtaining a smooth slide of the pedal bracket 22 relative to the vehicle body side slide member 80. However, after the deformation of the pedal bracket 22 is initiated, the deformation is continued with a relatively small force. Thus, in the present embodiment, even if the component force $F\theta$ of the pressing force F is decreased and the component force Ff is increased as the pedal bracket 22 moves in the rearward direction, the sliding motion of the pedal bracket 22 is continued.

In short, in the pedal supporting structure according to the present embodiment, when a large force is exerted on the front end of the vehicle, the pedal bracket 22 can be positively started to move in the rearward direction and a large movement can be achieved by moving the pedal bracket 22 along the slanted surface 82 of the vehicle body side slide member 80. Thus, according to the present embodiment, the pedal portion 18b of the brake pedal 18 can be positively and greatly moved in the forward direction of the vehicle.

Figure 14:
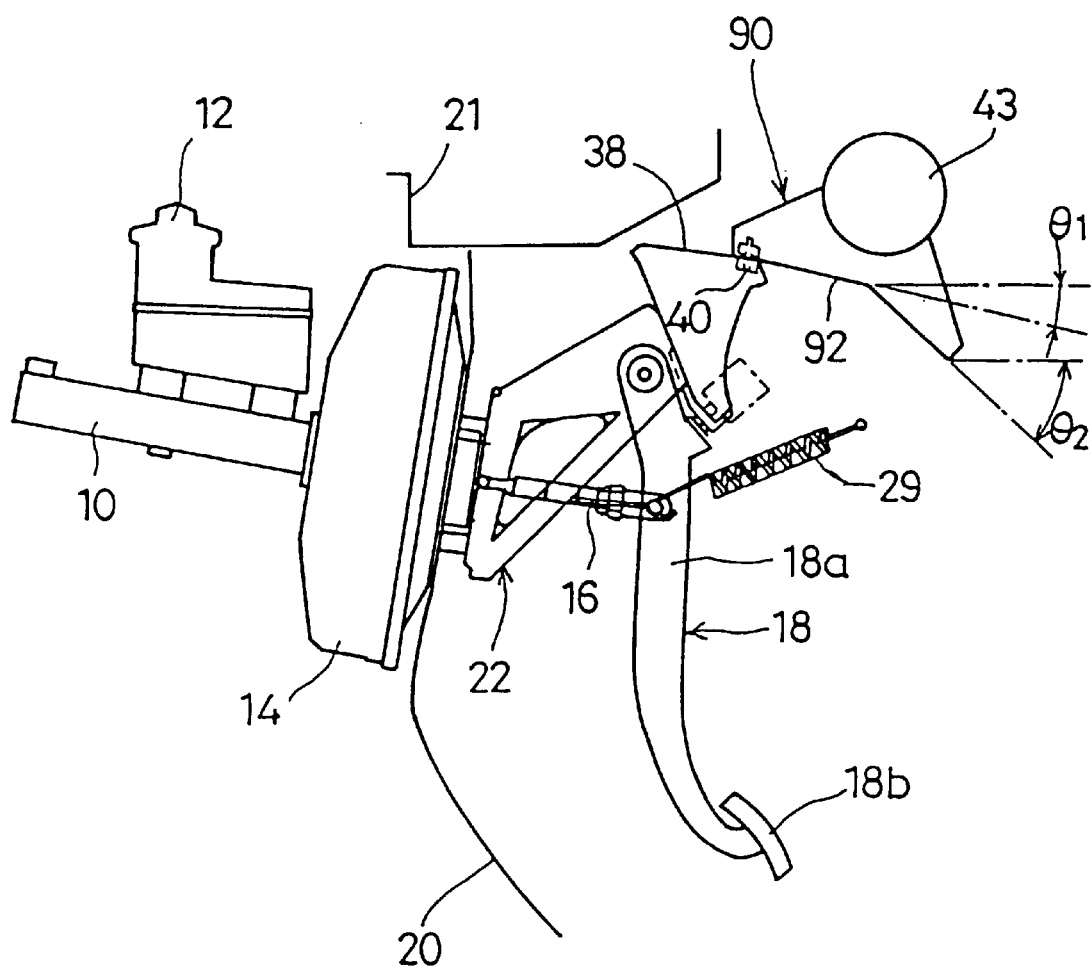
FIG. 14 is a side view of a pedal supporting structure according to a fifth embodiment of the present invention.

A description will now be given, with reference to FIG. 14, of a fifth embodiment of the present invention. FIG. 14 is a side view of a pedal supporting structure according to the fifth embodiment of the present invention. In FIG. 14, parts that are the same as the parts shown in FIG. 1 are given the same reference numerals, and descriptions thereof will be omitted.

The pedal supporting structure according to the embodiment uses a vehicle body side slide member 90 instead of the vehicle body side slide member 41 of the above-mentioned first embodiment. The vehicle body side slide member 90 has a slanted surface 92 on the bottom portion. A front side of the slanted surface 92 is fixedly slanted by an angle $\theta 1$ in the clockwise direction with respect to the horizontal plane of the vehicle. A rear side of the slanted surface 92 is fixedly slanted by an angle $\theta 2$ in the clockwise direction with respect to the horizontal plane of the vehicle. The angle $\theta 2$ is greater than the angle $\theta 1$ ($\theta 2 > \theta 1$).

The vehicle body side slide member 90 is engaged with the pedal bracket 22 by the bolt 40 at the front side thereof. When the pedal bracket 22 is moved in the rearward direction due to a large force exerted on the front end of the vehicle, the engagement by the bolt 40 is released. Then, the pedal bracket 22 further moves in the rearward direction while the bracket side slide surface 38 slides on the slanted surface 92 of the vehicle body side slide member 90.

The pedal bracket 22 maintains contact with the front side of the slanted surface 92 which is fixedly slanted by the angle $\theta 1$ which is the smaller angle. Thus, a relatively large component force F$\theta$ and a relatively small component force Ff, as explained above, are generated at the upper end of the pedal bracket 22 when the travel of the pedal bracket 22 is short.

When the movement of the pedal bracket 22 continues, the pedal bracket 22 slidingly contacts the rear side of the slanted surface 92 which is slanted by the angle $\theta 2$ which is the greater angle. Thus, when the travel of the pedal bracket 22 becomes large, an inclination of the pedal bracket 22 is increased. Accordingly, the pedal portion 18b of the brake pedal 18 can be moved in the forward direction to a large extent.

Figure 15:
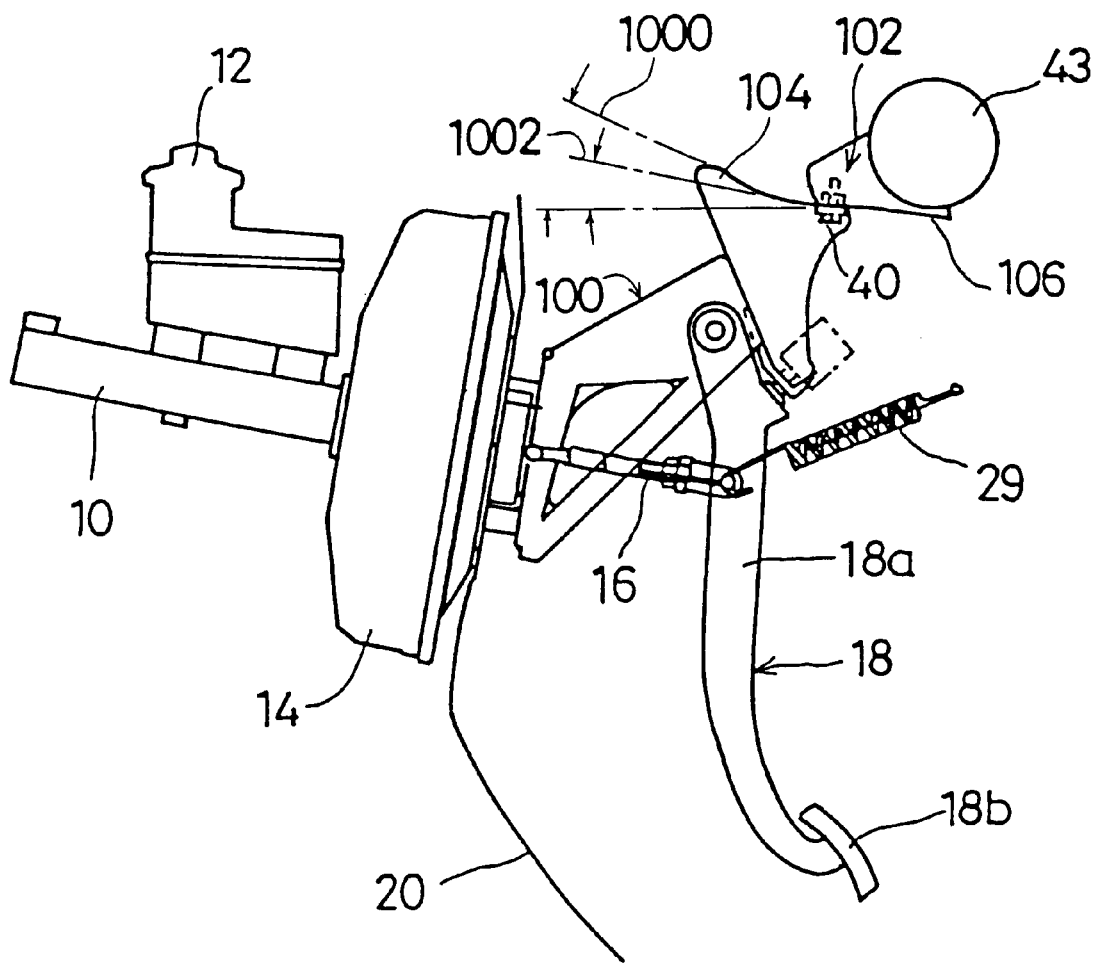
FIG. 15 is a side view of a pedal supporting structure according to a sixth embodiment of the present invention.

A description will now be given, with reference to FIG. 15, of a sixth embodiment of the present invention. FIG. 15 is a side view of a pedal supporting structure according to the sixth embodiment of the present invention. In FIG. 15, parts that are the same as the parts shown in FIG. 1 are given the same reference numerals, and descriptions thereof will be omitted.

The pedal supporting structure according to the present embodiment uses a pedal bracket 100 and a vehicle body side slide member 102 instead of the pedal bracket 22 and the vehicle body side slide member 41 of the above-mentioned first embodiment. The pedal bracket 100 has a bracket side slide portion 104 which is formed in a curved shape. A tangent line 1000 of the front side 104a of the bracket side slide portion 104 is greatly slanted in the clockwise direction with respect to the horizontal plane of the vehicle, and a tangent line 1002 of the rear side 104b of the bracket side slide portion 104 is slightly slanted in the clockwise direction with respect to the horizontal plane of the vehicle.

The vehicle body side slide member 102 has a slanted surface 106 on the bottom thereof which is fixedly slanted by substantially the same angle with the tangent line of the rear side of the bracket side slide portion 104. The vehicle body side slide member 102 is engaged with the rear side of the pedal bracket 100 by the bolt 40.

When the pedal bracket 100 is moved in the rearward direction due to a large force exerted on the front end of the vehicle, the engagement of the pedal bracket 100 by the bolt 40 is released. Then, if a pressing force F including a component in the rearward direction of the vehicle is exerted on the pedal bracket 100, the pedal bracket 100 further moves in the rearward direction while the bracket side slide portion 104 slides on the slanted surface 106 of the vehicle body side slide member 102.

The pedal bracket 100 maintains sliding contact with the vehicle body side slide member 102 in an area having a relatively small slanted angle. Thus, a relatively large component force F$\theta$ and a relatively small component force Ff, as discussed above, are generated at the upper end of the pedal bracket 100 when the travel of the pedal bracket 100 is short.

When the movement of the pedal bracket 100 continues, the pedal bracket 100 slidingly contacts the vehicle body side slide member 102 in an area having a relatively large slanted angle. Thus, when the travel of the pedal bracket 100 becomes large, an inclination of the pedal bracket 100 is increased. Accordingly, the pedal portion 18b of the brake pedal 18 can be moved in the forward direction to a large extent.

Figure 16:
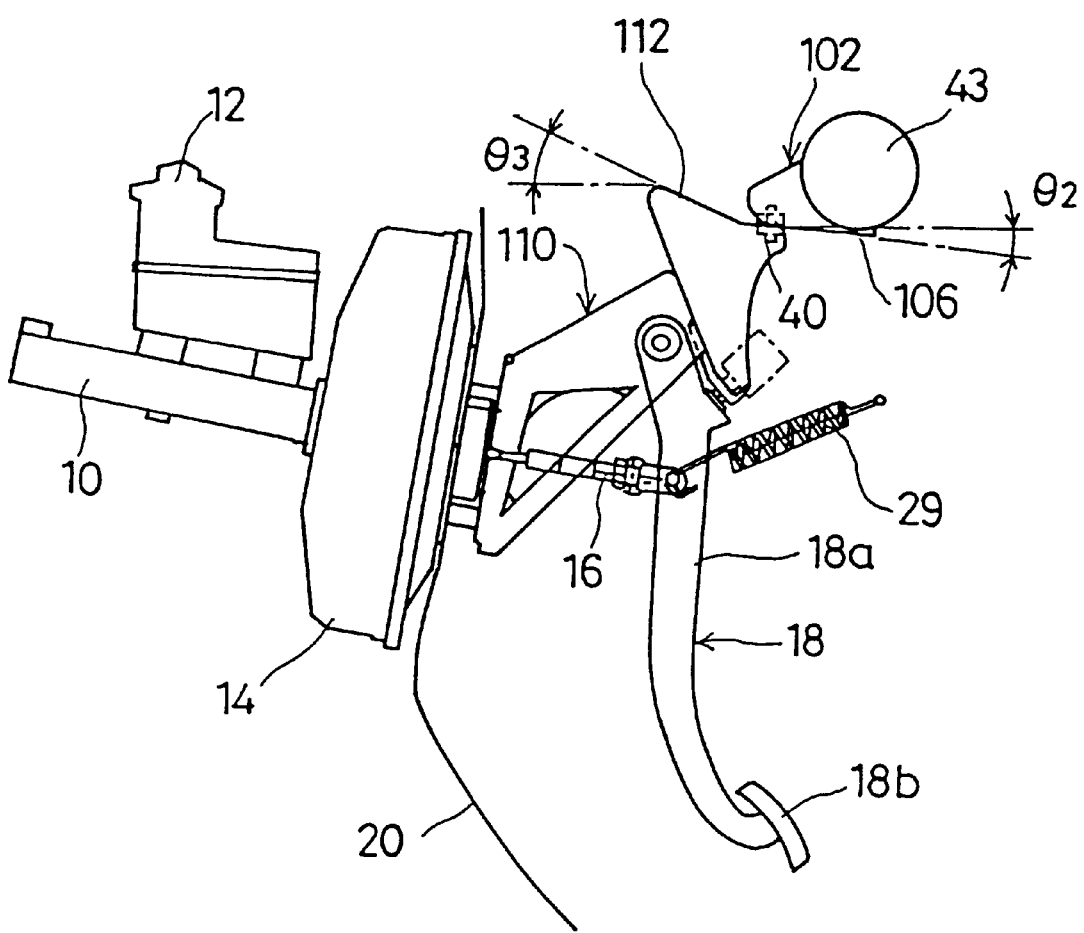
FIG. 16 is a side view of a pedal supporting structure according to a seventh embodiment of the present invention.

A description will now be given, with reference to FIG. 16, of a seventh embodiment of the present invention. FIG. 16 is a side view of a pedal supporting structure according to the seventh embodiment of the present invention. In FIG. 16, parts that are the same as the parts shown in FIGS. 1 and 15 are given the same reference numerals, and descriptions thereof will be omitted.

The pedal supporting structure according to the present embodiment uses a pedal bracket 110 and the vehicle body side slide member 102 instead of the pedal bracket 22 and the vehicle body side slide member 41 of the above-mentioned first embodiment. The pedal bracket 110 has a bracket side slide portion 112. The front side of the bracket side slide portion 112 is slanted by an angle $\theta 3$ in the clockwise direction with respect to the horizontal plane of the vehicle, and the rear side of the bracket side slide portion 112 is slanted by an angle $\theta 2$ in the clockwise direction with respect to the horizontal line.

The vehicle body side slide member 102 is engaged with the rear side of the pedal bracket 110 by the bolt 40. When the pedal bracket 110 is moved in the rearward direction due to a large force exerted on the front end of the vehicle, the engagement of the pedal bracket 110 by the bolt 40 is released. Then, if a pressing force F including a component in the rearward direction of the vehicle is exerted on the pedal bracket 110, the pedal bracket 110 further moves in the rearward direction while the bracket side slide portion 112 slides on the slanted surface 106 of the vehicle body side slide member 102.

The pedal bracket 110 maintains sliding with the vehicle body side slide member 102 on the rear side of the bracket side slide portion 112 which is slanted by the angle $\theta 2$ which is a relatively small angle. Thus, a relatively large component force Fθ and a relatively small component force Ff are generated at the upper end of the pedal bracket 110 when the travel of the pedal bracket 110 is short.

When the movement of the pedal bracket 110 continues, the pedal bracket 110 slidingly contacts the vehicle body side slide member 102 on the front side of the bracket side slide portion 112 which is slanted by the angle θ3 which is a relatively large angle. Thus, when the travel of the pedal bracket 110 becomes large, an inclination of the pedal bracket 110 is increased. Accordingly, the pedal portion 18b of the brake pedal 18 can be moved in the forward direction to a large extent.

Figure 17:
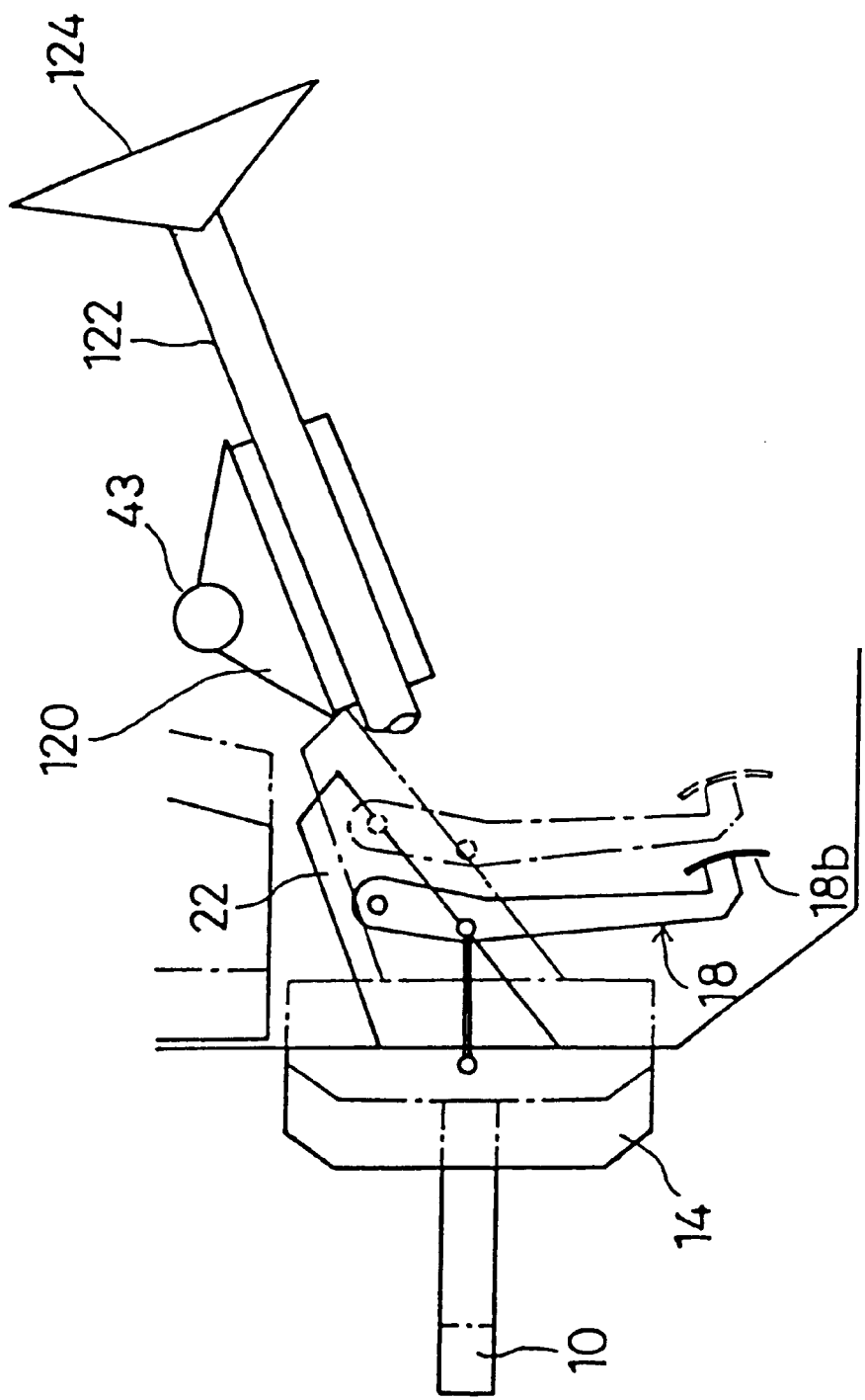
FIG. 17 is a side view of a pedal supporting structure and a conventional steering wheel supporting construction according to an eighth embodiment of the present invention.
Figure 18:
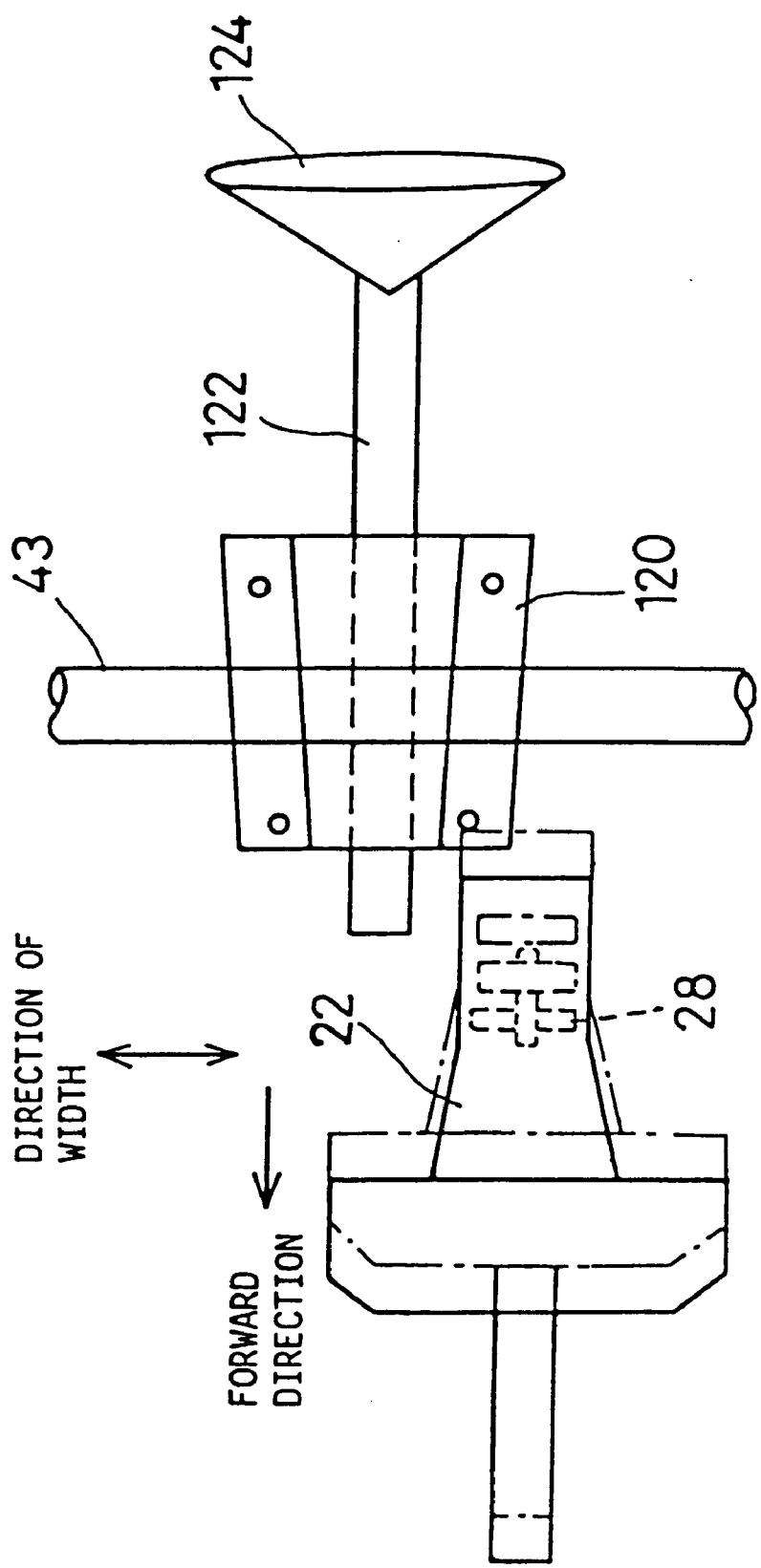
FIG. 18 is a plan view of the pedal supporting structure and the steering wheel supporting construction shown in FIG. 17.
Figure 19:
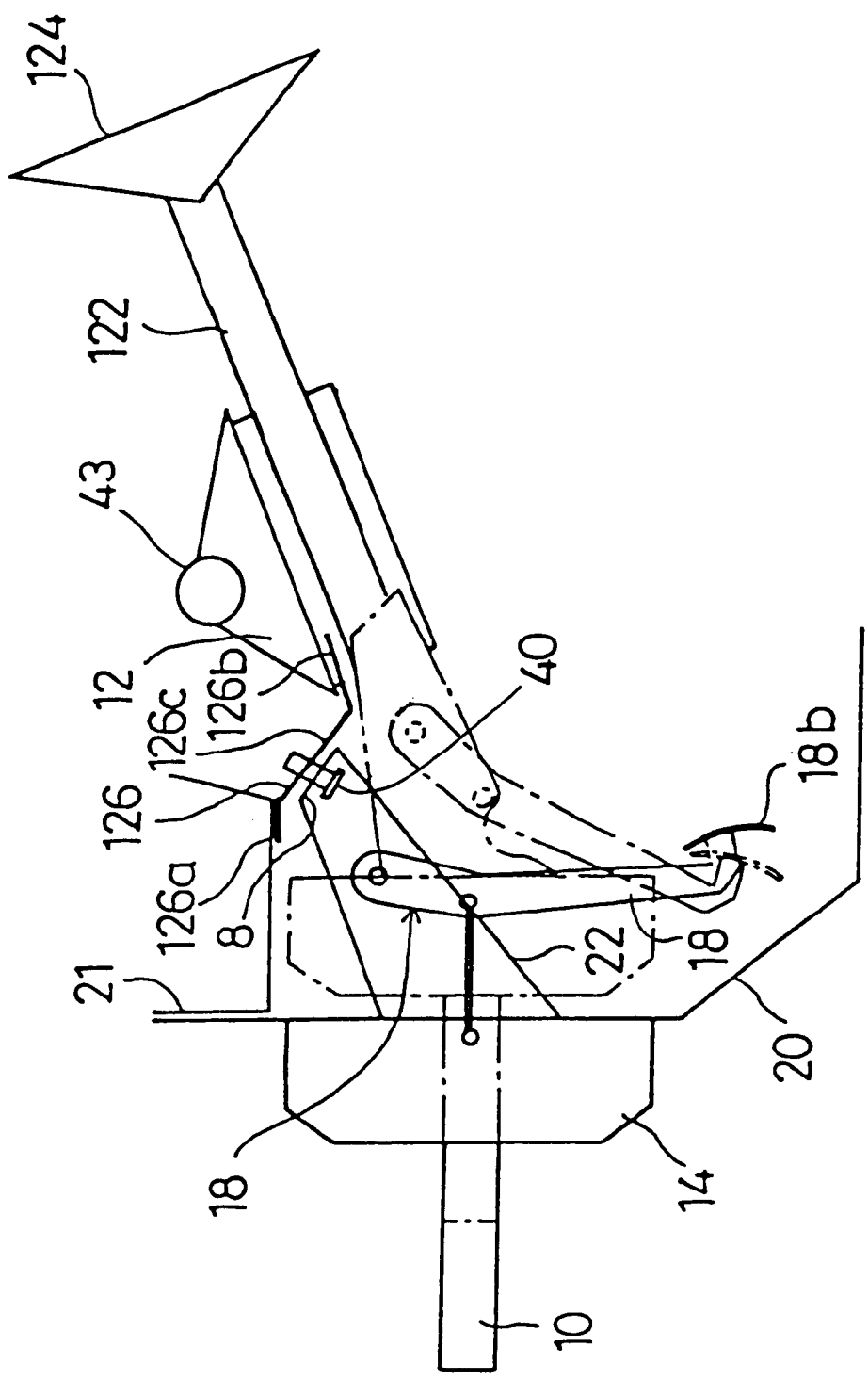
FIG. 19 is a side view of a pedal supporting structure according to eighth embodiment of the present invention.

A description will now be given, with reference to FIGS. 17, 18 and 19, of an eighth embodiment according to the present invention. In FIGS. 17, 18 and 19, parts that are the same as the parts shown in FIGS. 1 to 16 are given the same reference numerals, and descriptions thereof will be omitted.

FIG. 17 is a side view of a pedal supporting structure and a steering wheel supporting structure. FIG. 18 is a plan view of the pedal supporting structure and the steering wheel supporting construction shown in FIG. 17. In FIGS. 17 and 18, solid lines indicate an initial state where a large force is not exerted on the front end of the vehicle, and dashed lines indicate a state where the brake booster 14 is moved in the rearward direction of the vehicle due to a large force exerted on the front end of the vehicle.

As shown in FIGS. 17 and 18, a steering support 120 is fixed on an inner panel reinforcing member 43. The steering support 120 supports a steering shaft 122. a steering wheel 124 is mounted on an end of the steering shaft 122 supported by the steering support 120.

There may be a case in which the steering support 120 is located at the same height as the upper end of the pedal bracket 22 as shown in FIG. 17. Additionally, there may be a case in which the steering support 120 is located near an extension of the center line of the master cylinder 10 as shown in FIG. 18. When the pedal bracket 22 and the steering support 120 are arranged in the above-mentioned positional relationship, the upper end of the pedal bracket 22 interferes with the steering support 120 when the pedal bracket moves in the rearward direction as indicated by dashed lines in FIGS. 17 and 18.

In the pedal supporting structure shown in FIGS. 17 and 18, in order to move the pedal portion 18b of the brake pedal 18 when a large force is exerted on the front end of the vehicle, it is effective to incline the pedal bracket 22 so that the upper end of the pedal bracket 22 is moved in the downward direction of the vehicle during a process in which the pedal bracket 22 moves in the rearward direction. However, if the pedal bracket 22 and the steering support 120 are arranged in the above-mentioned positional relationship, the pedal bracket cannot be appropriately inclined unless the interference between the pedal support 22 and the steering support 120 is avoided.

FIG. 19 is a side view of a pedal supporting structure according to an eighth embodiment of the present invention. The pedal supporting structure according to the eighth embodiment of the present invention eliminates the above-mentioned problem in which the pedal bracket 22 interferes with the steering support 120 by appropriately inclining the pedal bracket 22 when the pedal.

The pedal supporting structure shown in FIG. 19 uses a vehicle body side slide member 126. The vehicle body side slide member 126 includes a first fixing portion 126a, a second fixing portion 126b and a slanted surface 126c. The first fixing portion 126a is fixed to a bottom surface of the cowl plate 21. The second fixing portion 126b is fixed to a bottom surface of the steering support 120. The slanted surface 126c is formed between the first fixing portion 126a and the second fixing portion 126b. The slanted surface 126c is slanted so that a height of a portion of the slanted surface 126c is decreased in the rearward direction of the vehicle.

The pedal bracket 22 is connected to the slanted surface 126c of the vehicle body side slide member 126 by the bolt 40. When the pedal bracket 22 is moved in the rearward direction due to a large force exerted on the front end of the vehicle, the pedal bracket 22 is released from the engagement with the bolt 40. Thereafter, the upper end of the pedal bracket 22 moves in the rearward and downward direction of the vehicle while sliding on the slanted surface 126c. Since the rear end of the slanted surface 126c is located in a position under the steering support 120, the pedal bracket 22 does not interfere with the steering support 120 during a process in which the pedal bracket 22 moves in the rearward direction of the vehicle.

In the pedal supporting structure according to the present embodiment, the pedal bracket 22 is appropriately inclined when a large force is exerted on the front end of the vehicle even when the steering support 120 is located in the rearward direction. That is, the pedal portion 18b of the brake pedal 18 is greatly moved by a large mount of travel in the forward direction of the vehicle when the pedal bracket 22 is moved in the rearward direction.

Figure 20:
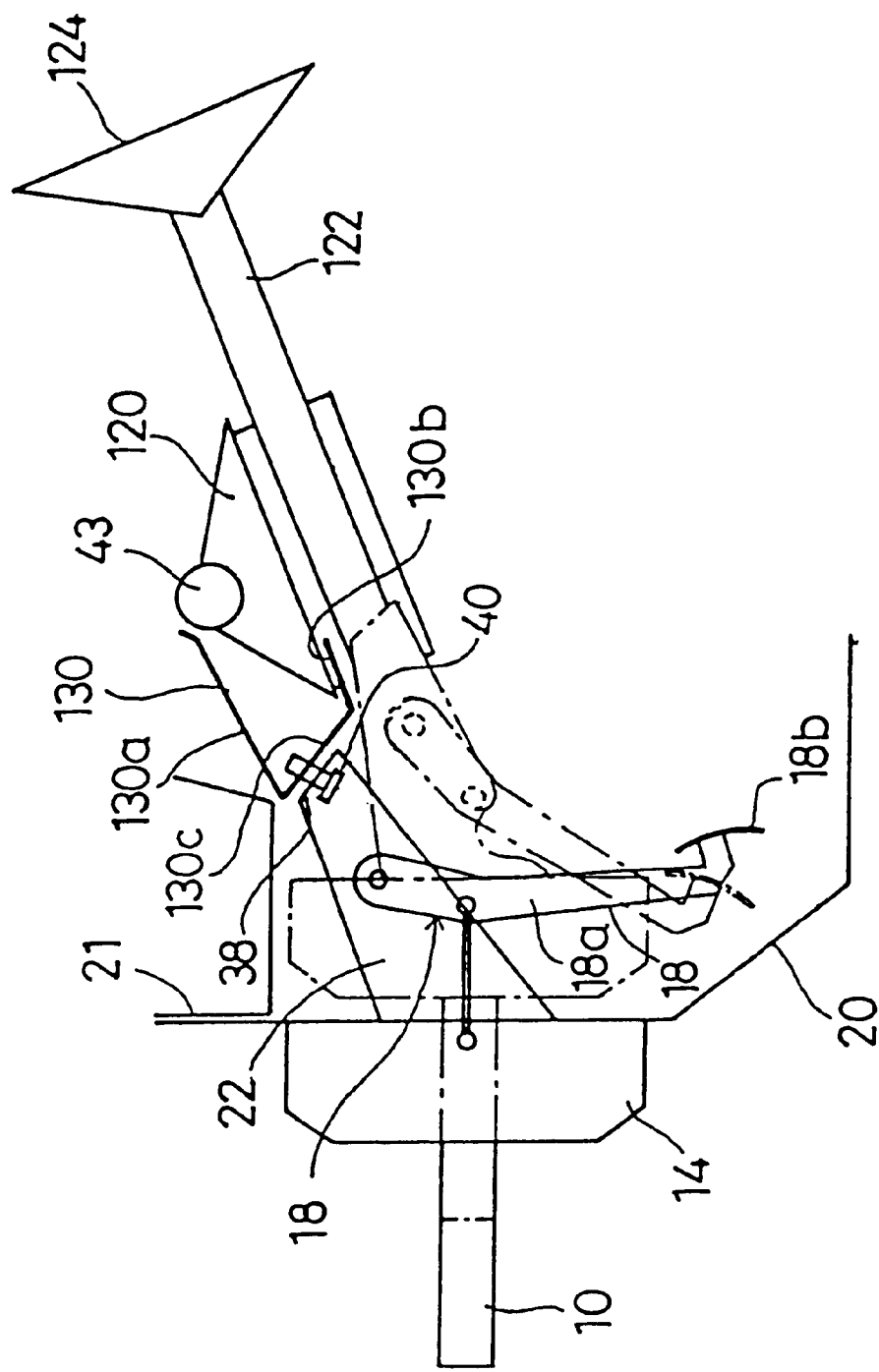
FIG. 20 is a side view of a pedal supporting structure according to a ninth embodiment of the present invention.

A description will now be given, with reference to FIG. 20, of a ninth embodiment of the present invention. FIG. 20 is a side view of a pedal supporting structure according to the ninth embodiment of the present invention. In FIG. 20, parts that are the same as the parts shown in FIGS. 1 to 19 are given the same reference numerals, and descriptions thereof will be omitted.

The pedal supporting structure shown in FIG. 20 uses a vehicle body side slide member 130. The vehicle body side slide member 130 includes a first fixing portion 130a, a second fixing portion 130b and a slanted surface 130c. The first fixing portion 130a is fixed to the inner panel reinforcing member 43. The second fixing portion 130b is fixed to a bottom surface of the steering support 120. The slanted surface 130c is formed between the first fixing portion 130a and the second fixing portion 130b. The slanted surface 130c is slanted so that a height of a portion of the slanted surface 126c is decreased in the rearward direction of the vehicle.

The pedal bracket 22 is connected to the slanted surface 130c of the vehicle body side slide member 130 by the bolt 40. When the pedal bracket 22 is moved in the rearward direction due to a large force exerted on the front end of the vehicle, the pedal bracket 22 is released from engagement with the bolt 40. Thereafter, the upper end of the pedal bracket 22 moves in the rearward and downward direction of the vehicle while sliding on the slanted surface 130c. Since the rear end of the slanted surface 130c is located in a position under the steering support 120, the pedal bracket 22 does not interfere with the steering support 120 during a process in which the pedal bracket 22 moves in the rearward direction of the vehicle.

In the pedal supporting structure according to the present embodiment, the pedal bracket 22 is appropriately inclined when a large force is exerted on the front end of the vehicle even when the steering support 120 is located in the rearward direction. That is, the pedal portion 18b of the brake pedal 18 is moved through a substantial distance of travel in the forward direction of the vehicle when the pedal bracket 22 is moved in the rearward direction.

Figure 21:
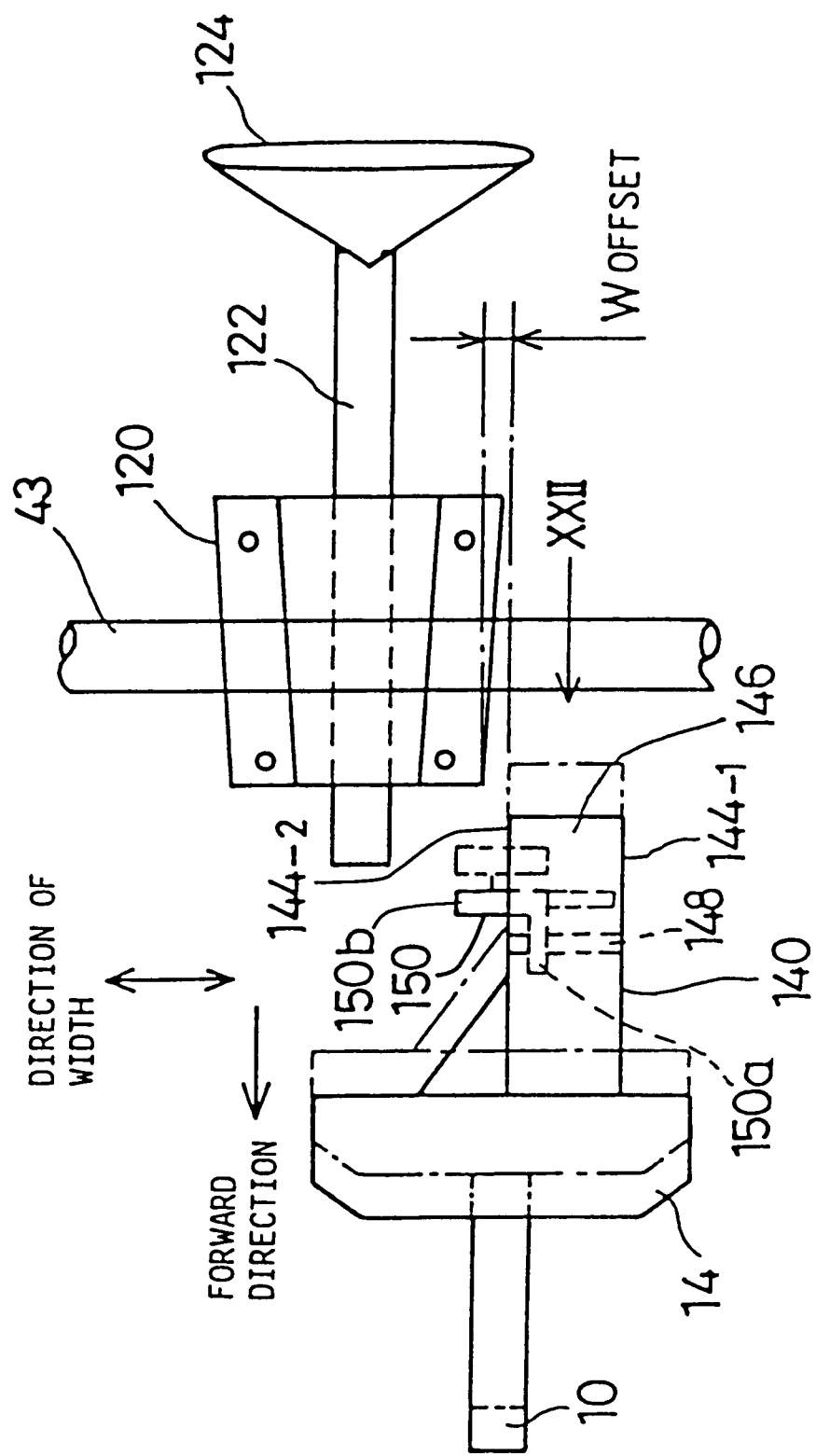
FIG. 21 is a plan view of a pedal supporting structure according to a tenth embodiment of the present invention.
Figure 22:
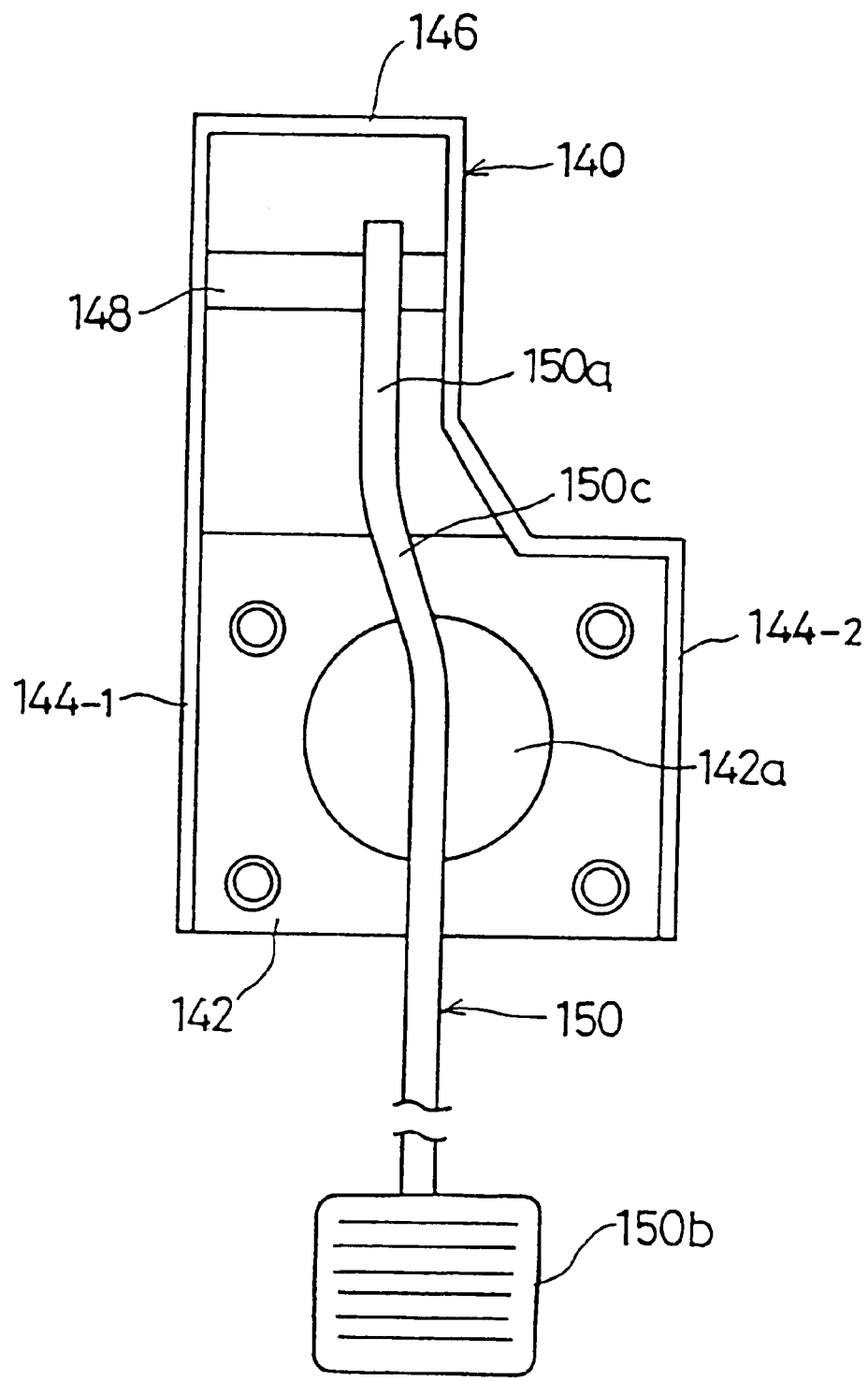
FIG. 22 is a view of a pedal bracket 140 shown in FIG. 21 viewed in a direction indicated by an arrow XXI.

A description will now be given, with reference to FIG. 21 and 22, of a tenth embodiment of the present invention. FIG. 21 is a plan view of a pedal supporting structure according to the tenth embodiment of the present invention. FIG. 22 is a view of a pedal bracket 140 shown in FIG. 21 viewed in a direction indicated by an arrow XXI. In FIGS. 21 and 22, parts that are the same as the parts shown in FIGS. 1 to 20 are given the same reference numerals, and descriptions thereof will be omitted.

In the pedal supporting structure according to the tenth embodiment, the pedal bracket 140 shown in FIG. 22 is used. The pedal bracket 140 includes a fixing portion 142, shown only in FIG. 22, side walls 144-1 and 144-2 provided on each side of the fixing portion 142 and a bracket side slide portion 146 formed between the side walls 144-1 and 144-2.

The fixing portion 142 has a through opening 142a, shown only in FIG. 22, centered with respect to the width of the fixing portion 142. The pedal bracket 140 is arranged in the pedal supporting structure so that the center of the through opening 142a corresponds to the center of the master cylinder 10, shown only FIG. 21. The bracket side slide portion 146 is offset from the center of the through opening 142a in the leftward direction in FIG. 22.

A pivot shaft 148 is provided between the side walls 144-1 and 144-2. An end of a lever portion 150a of a brake pedal 150 is pivotally supported by the pivot shaft 148. The lever portion 150a of the brake pedal 150 has a bent portion 150c, shown only in FIG. 22 in the middle thereof so that no offset is provided between the center of a pedal portion 150b and the center of the through opening 142a. The brake pedal is connected via a depression force transmitting shaft (not shown in the figure) which protrudes through the through opening 142a and is connected to the brake booster 14, shown only in FIG. 21.

When the pedal bracket 140 is arranged in the pedal mounting structure so that the center of the through opening 142a corresponds to the center of the master cylinder 10, an offset is provided in a direction of the width of the vehicle between the bracket side slide portion 146 of the pedal bracket 140 and the center of the brake booster 14 as shown in FIG. 21. Thus, an offset is provided between the side wall 144-2 and the side of the steering support 120 irrespective of the side of the steering support 120 being present in an extension of the center axis of the master cylinder 10.

If such an offset is provided between the side wall 144-2 and the side of the steering support 120, the pedal bracket 140 can be inclined without interference with the steering support. Thus, according to the present embodiment, the pedal portion 150b of the brake pedal 150 is positively moved in the forward direction when a large force is exerted on the front end of the vehicle.

It should be noted that although a guide mechanism for guiding the pedal bracket 140 to be inclined is not shown in FIGS. 21 and 22, the guiding mechanism can be provided in a manner similar to that of the above-mentioned first to ninth embodiments.

The present invention is not limited to the specifically disclosed embodiments, and variations and modifications may be made without departing from the scope of the present invention.

What is claimed is:

1. A pedal supporting structure in a vehicle, comprising:
    a pedal including a lever portion extending from said pedal;
    a pedal bracket pivotably supporting said lever portion of said pedal;
    a body member located adjacent said pedal bracket;
    a connection mechanism that disengageably engages a portion of said pedal bracket to said body member by a front-to-rear movement of said pedal bracket relative to said body member in a front-to-rear direction of said vehicle; and
    a guiding mechanism in sliding contact with said pedal bracket so as to slidingly guide said front-to-rear movement of said pedal bracket so that said front-to-rear movement of said pedal bracket causes a movement of said pedal relative to said body member in a rear-to-front direction of said vehicle and so that said front-to-rear movement of said pedal bracket includes a degree of downward movement relative to said vehicle that increases as said pedal bracket moves rearwardly relative to said vehicle and so that said pedal is moved relative to a forward end of said vehicle.

2. The pedal supporting structure as claimed in claim 1, wherein said pedal bracket is disengaged from said body member when said pedal bracket is moved in a predetermined direction, said predetermined direction being substantially the same as a direction of a force transmitted to said pedal bracket when a substantial force is exerted on a front end of said pedal bracket.

3. The pedal supporting structure as claimed in claim 1, wherein said lever portion is urged in a front-to-rear direction of said vehicle, and said pedal bracket comprises:
    a stopper limiting a movement of said pedal lever in said front-to-rear direction so that said pedal is positioned at a normal position; and
    a pressing portion limiting a pivotal movement of said lever portion in said front-to-rear direction when said lever portion moves further from said normal position in said front-to-rear direction.

4. The pedal supporting structure as claimed in claim 1, wherein said vehicle side slide member has a slanted portion extending to a position under a lower end of a steering support supporting a steering shaft of said vehicle; and
    wherein said bracket side slide portion is slidingly engaged with said slanted portion so that said bracket side slide portion slides along said slanted portion when said pedal bracket is moved in a front-to-rear direction of said vehicle.

5. The pedal supporting structure as claimed in claim 1, wherein at least an upper portion of said pedal bracket is offset from a steering support supporting a steering shaft of said vehicle in a direction of width of said vehicle.

6. The pedal supporting structure of claim 1, wherein said guiding mechanism comprises:
    a vehicle body side slide member fixed to said body member; and
    a bracket side slide portion formed on an upper side of said pedal bracket, said bracket side slide portion slidingly contacting said vehicle body side slide member, wherein one of said vehicle body side slide member and said bracket side slide portion has a slanted surface that is fixedly slanted relative to a horizontal plane of said vehicle.

7. The pedal supporting structure of claim 6, wherein said vehicle body side slide member has said slanted surface and said slanted surface has a rear end and a front end relative to said vehicle, said rear end being lower than said front end relative to said vehicle.

8. The pedal supporting structure as claimed in claim 7, wherein said slanted surface has a slanted angle that is increased from said front end toward said rear end of said slanted surface.

9. The pedal supporting structure as claimed in claim 7, wherein said bracket side slide portion comprises a rounded smooth surface connected to said rear end of said slanted surface, said rounded smooth surface moving ahead of said slanted surface when said pedal bracket moves in said front-to-rear direction of said vehicle.

10. The pedal supporting structure as claimed in claim 7, wherein said bracket side slide portion comprises a flexible portion connected to said rear end of said slanted surface, said flexible portion moving ahead of said slanted surface when said pedal bracket moves in said front-to-rear direction of said vehicle so that said flexible portion is deformed when said flexible portion is pressed against said vehicle body side slide member.

11. The pedal supporting structure as claimed in claim 6, wherein said pedal bracket comprises a surface connected to a rear end of said bracket side slide portion, said surface moving ahead of said bracket side slide portion when said pedal bracket moves in said front-to-rear direction of said vehicle.

12. The pedal supporting structure as claimed in claim 11, wherein said pedal bracket comprises a flexible portion connected to a rear end of said bracket side slide portion, said flexible portion moving ahead of said bracket side slide portion when said pedal bracket moves in said front-to-rear direction of said vehicle so that said flexible portion is deformed when said flexible portion is pressed against said slanted surface.

13. The pedal supporting structure of claim 6, wherein said bracket side slide portion has said slanted surface and said slanted surface has a rear end and a front end relative to said vehicle, said rear end being lower than said front end relative to said vehicle.

14. The pedal supporting structure as claimed in claim 13, wherein said slanted surface has a slanted angle that is increased from said rear end toward said front end of said slanted surface.

15. The pedal supporting structure as claimed in claim 14, wherein said slanted surface is a curved surface.

16. The pedal supporting structure of claim 6, wherein said vehicle body side slide member has said slanted surface and said slanted surface has a slanted angle that is increased from a front end toward a rear end thereof.

17. The pedal supporting structure of claim 6, wherein said bracket side slide portion has said slanted surface and said slanted surface has a slanted angle that is increased from a rear end toward a front end thereof.

18. A pedal supporting structure in a vehicle, comprising:
a pedal including a lever portion extending from said pedal;
a pedal bracket pivotally supporting said lever portion of said pedal;
a body member of said vehicle located adjacent said pedal bracket;
a connection mechanism disengageably engaging a portion of said pedal bracket to said body member;
a guiding mechanism for guiding a movement of said pedal bracket so that said movement of said pedal bracket causes a movement of said pedal relative to said body member in a rear-to-front direction of said vehicle, wherein said guiding mechanism comprises a vehicle body side slide member fixed to said body member, said vehicle body side slide member having a surface slanted by a slanting angle with respect to a front-to-rear direction of said vehicle so that a rear end of said slanted surface is lower than a front end of said slanted surface and said slanted angle is increased from said front end toward said rear end of said slanted surface, wherein said slanted surface is a curved surface; and
a bracket side slide portion formed on an upper side of said pedal bracket, said bracket side slide portion slidingly contacting said slanted surface.

19. A pedal support assembly comprising:
a pedal including a lever portion; and
a pedal bracket pivotably supporting said lever portion and having a bracket side slide portion disengageably engaging a body member, wherein a slope of a rear side of said bracket side slide portion is less than a slope of a front side, said bracket side slide portion increasing the degree of a downward movement of said pedal bracket relative to said body member through contact between said bracket side slide portion and said body member as said pedal bracket moves rearwardly.

* * * * *